United States Patent
Motwani et al.

(10) Patent No.: US 9,590,838 B2
(45) Date of Patent: Mar. 7, 2017

(54) TRANSFERRING DATA OF A DISPERSED STORAGE NETWORK

(71) Applicant: CLEVERSAFE, INC., Chicago, IL (US)

(72) Inventors: Manish Motwani, Chicago, IL (US); Jason K. Resch, Chicago, IL (US); Andrew Baptist, Mt. Pleasant, WI (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 548 days.

(21) Appl. No.: 14/029,347

(22) Filed: Sep. 17, 2013

(65) Prior Publication Data

US 2014/0019579 A1   Jan. 16, 2014

Related U.S. Application Data

(63) Continuation-in-part of application No. 13/289,200, filed on Nov. 4, 2011.
(Continued)

(51) Int. Cl.
G06F 12/02 (2006.01)
H04L 29/08 (2006.01)
(Continued)

(52) U.S. Cl.
CPC ........ H04L 29/08549 (2013.01); G06F 3/067 (2013.01); G06F 3/0614 (2013.01);
(Continued)

(58) Field of Classification Search
CPC ....................................................... G06F 12/02
(Continued)

(56) References Cited

U.S. PATENT DOCUMENTS 4,092,732 A   5/1978   Ouchi
5,454,101 A   9/1995   Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Tuan Thai
*Assistant Examiner* — Gautam Sain
(74) *Attorney, Agent, or Firm* — Garlick & Markison; Timothy W. Markison; Shayne X. Short

(57) ABSTRACT

A method begins by a dispersed storage (DS) processing detecting unavailability of a storage device of a site of dispersed storage network (DSN) memory to produce an unavailable storage device. The method continues with the DS processing module reassigning a fraction of a logical address sub-range of the unavailable storage device to one or more other storage devices, rebuilding one or more logically addressable data objects to produce one or more rebuilt data objects and storing the one or more rebuilt data objects in the one or more other storage devices. When the unavailable storage device becomes available, the method continues with the DS processing module reallocating the fraction of the logical address sub-range from the one or more other storage devices to the storage device and transferring the one or more rebuilt data objects from the one or more other storage devices to the storage device.

14 Claims, 19 Drawing Sheets

Related U.S. Application Data

(60) Provisional application No. 61/411,478, filed on Nov. 9, 2010.

(51) Int. Cl.
*G06F 3/06* (2006.01)
*H04L 29/14* (2006.01)
*G06F 12/06* (2006.01)
*G06F 15/16* (2006.01)
*G06F 11/10* (2006.01)

(52) U.S. Cl.
CPC ............ *G06F 3/0647* (2013.01); *G06F 12/02* (2013.01); *H04L 67/1095* (2013.01); *H04L 67/1097* (2013.01); *H04L 69/40* (2013.01); *G06F 11/1076* (2013.01); *G06F 2211/1057* (2013.01)

(58) Field of Classification Search
USPC ......................................................... 711/165
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1* | 4/2007 | Gladwin .............. G06F 11/1076 711/154 |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1* | 7/2008 | Foster ................. G06F 11/1076 711/153 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0169575 A1* | 7/2010 | Masaki .............. G06F 11/1092 711/114 |
| 2010/0325478 A1* | 12/2010 | Maeda ................ G06F 11/2094 714/6.12 |
| 2011/0208910 A1* | 8/2011 | Takada ................. G06F 3/0617 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, Ti1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

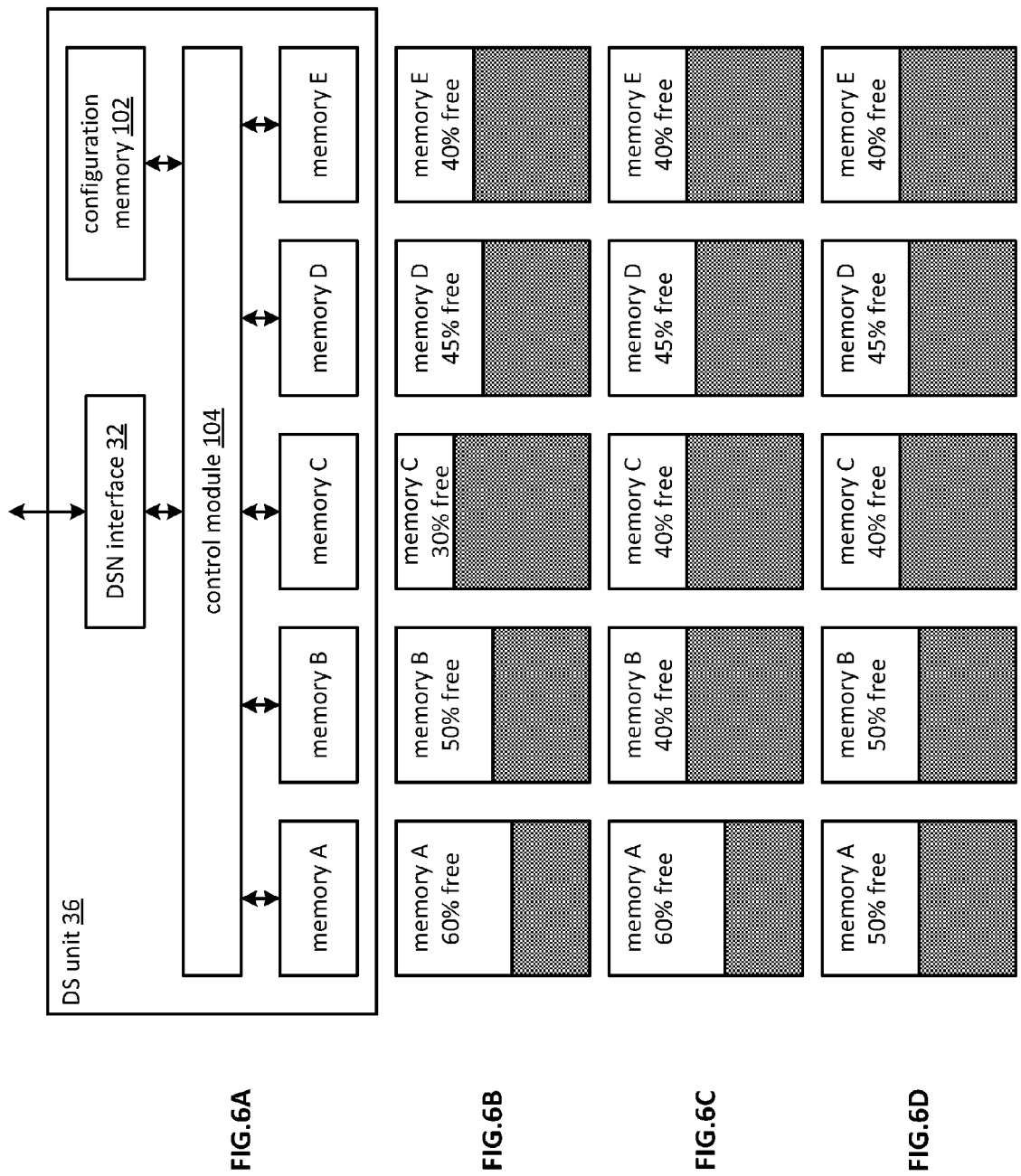

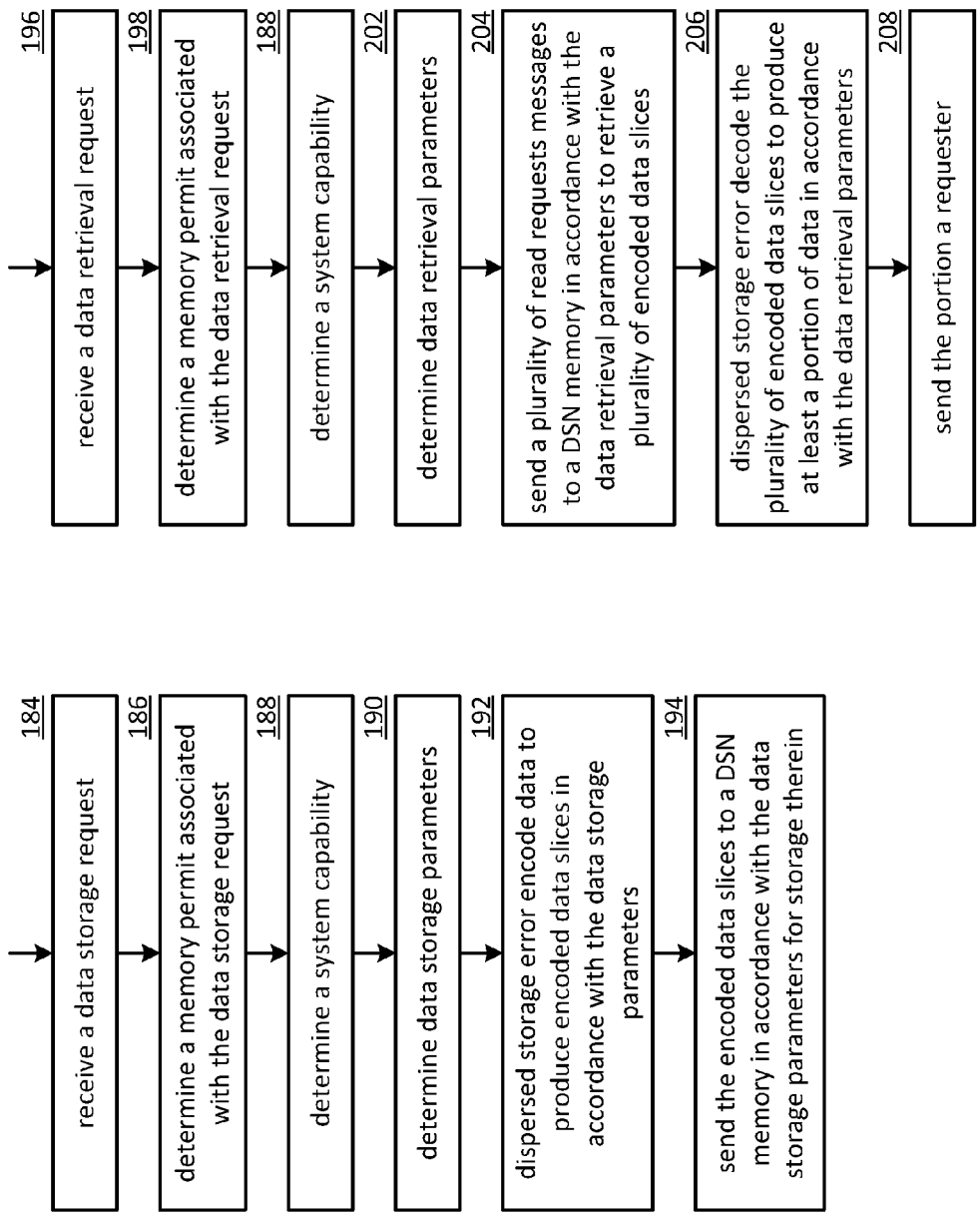

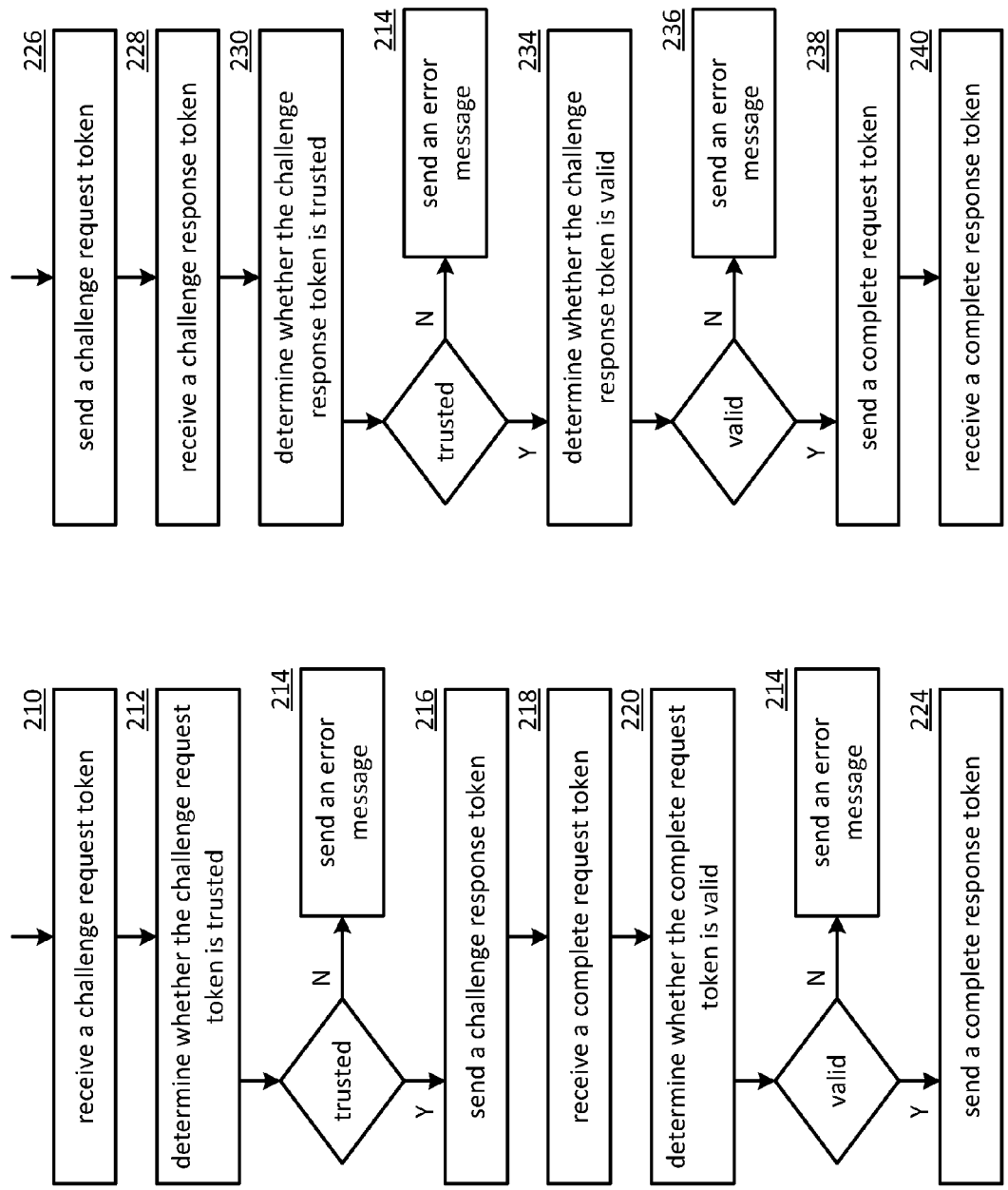

TRANSFERRING DATA OF A DISPERSED STORAGE NETWORK

CROSS-REFERENCE TO RELATED PATENTS

The present U.S. Utility patent application claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility application Ser. No. 13/289,200, entitled "BALANCING MEMORY UTILIZATION IN A DISPERSED STORAGE NETWORK", filed Nov. 4, 2011, pending, which claims priority pursuant to 35 U.S.C. §119 (e) to the following U.S. Provisional patent application which is hereby incorporated herein by reference in its entirety and made part of the present U.S. Utility patent application for all purposes:

a. U.S. Provisional Application Ser. No. 61/411,478, entitled "BALANCING MEMORY UTILIZATION IN A DISPERSED STORAGE NETWORK," filed Nov. 9, 2010.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc., are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6A is a schematic block diagram of an embodiment of a dispersed storage (DS) unit in accordance with the invention;

FIG. 6B is a diagram illustrating an example of free memory availability for a plurality of memories in accordance with the invention;

FIG. 6C is a diagram illustrating another example of free memory availability for a plurality of memories in accordance with the invention;

FIG. 6D is a diagram illustrating another example of free memory availability for a plurality of memories in accordance with the invention;

Figure 7A:
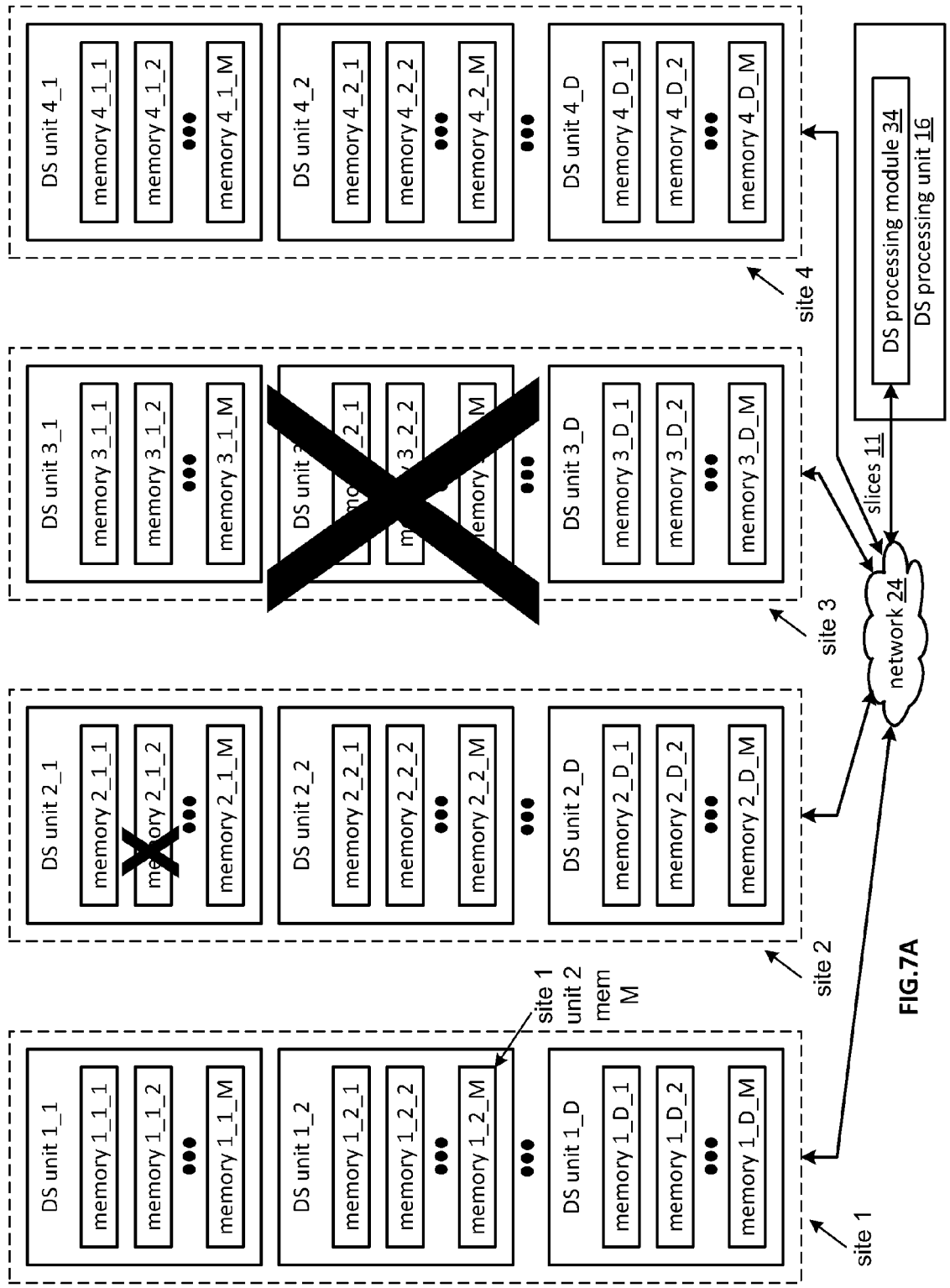
FIG. 7A is a schematic block diagram of an embodiment of a dispersed storage network (DSN) in accordance with the present invention.
Figure 7B:
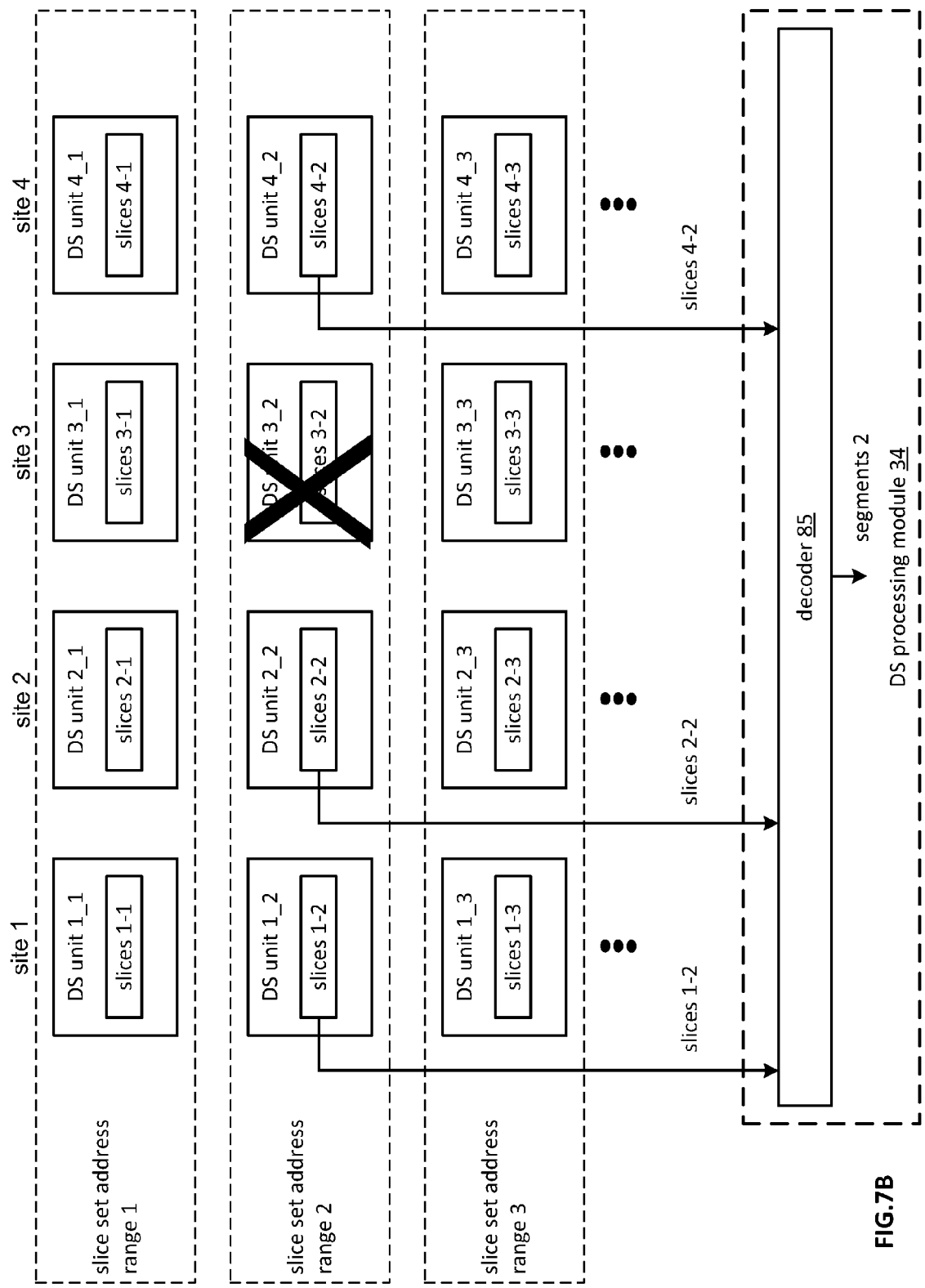
FIGS. 7B-7D are schematic block diagrams of another embodiment of a dispersed storage network (DSN) illustrating example steps of transferring data in accordance with the present invention.
Figure 7C:
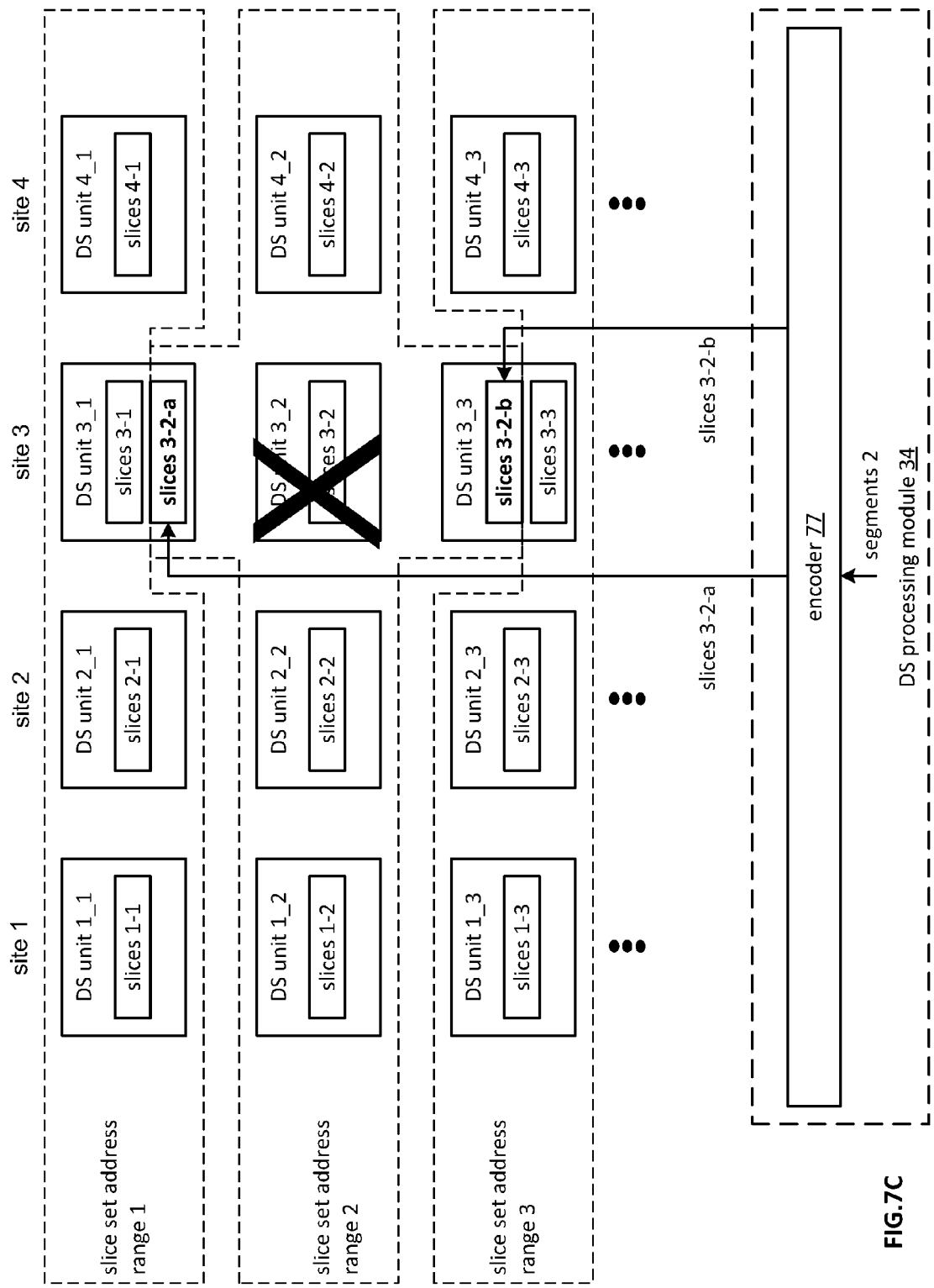
Figure 7D:
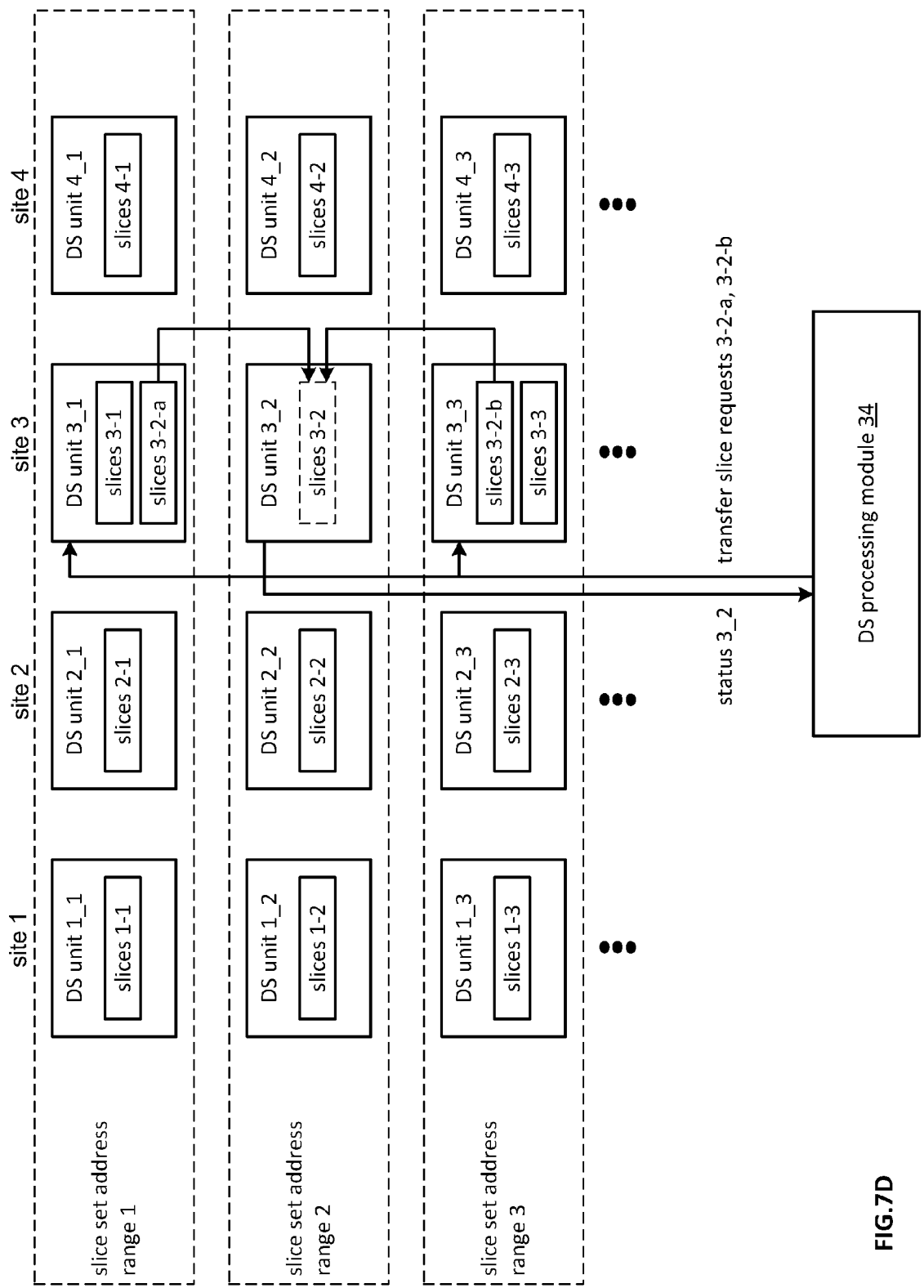
Figure 7E:
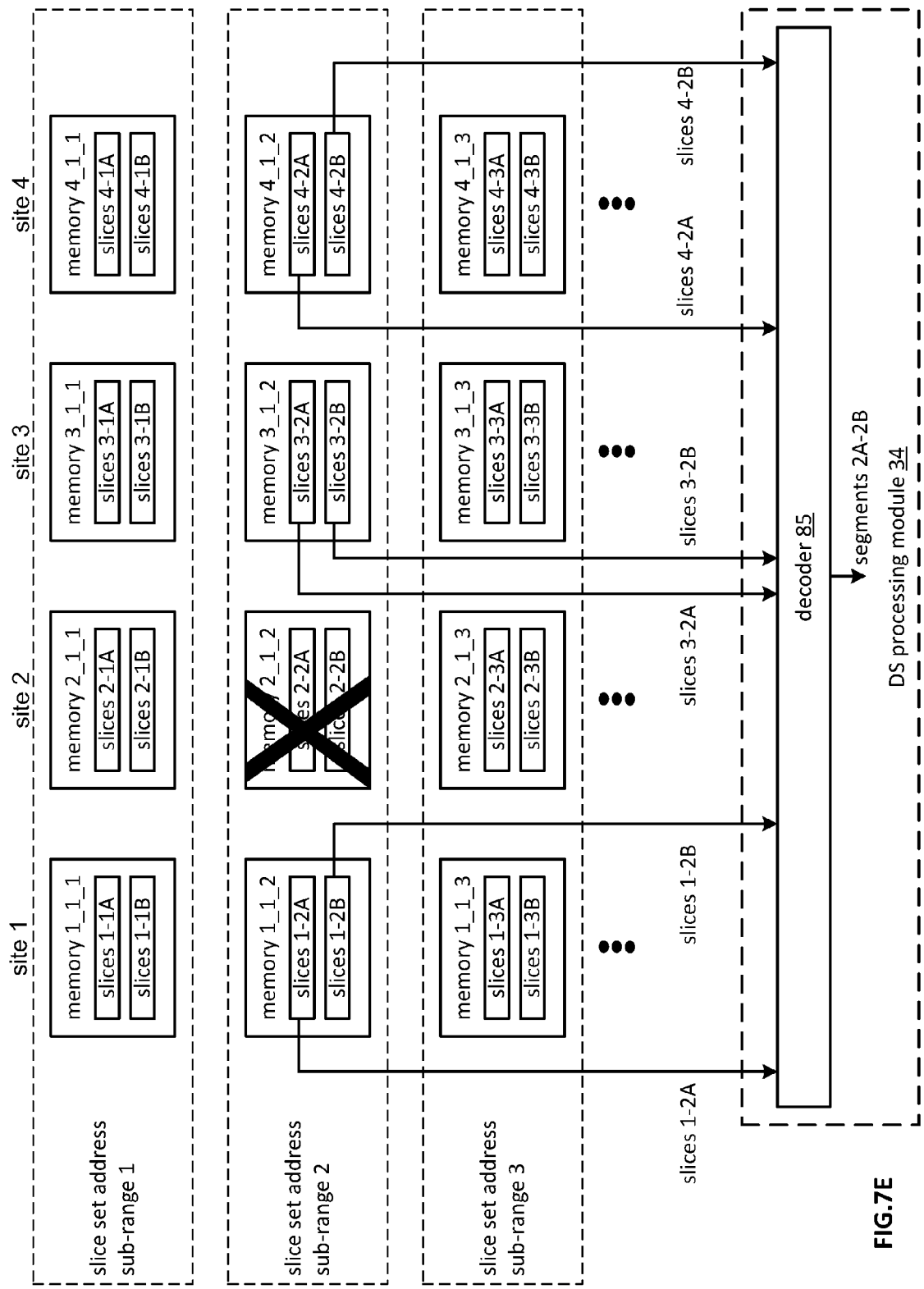
Figure 7F:
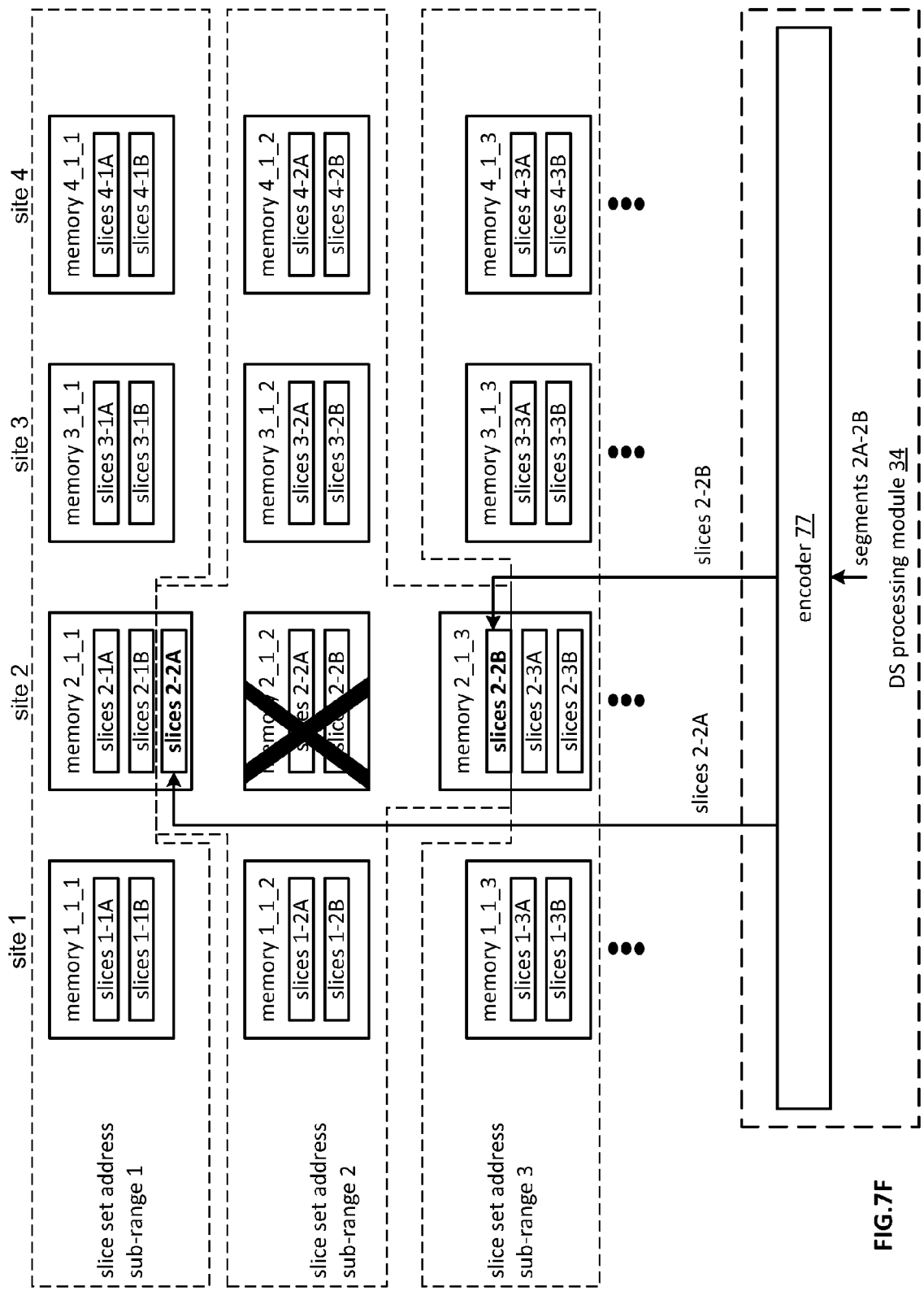
Figure 7G:
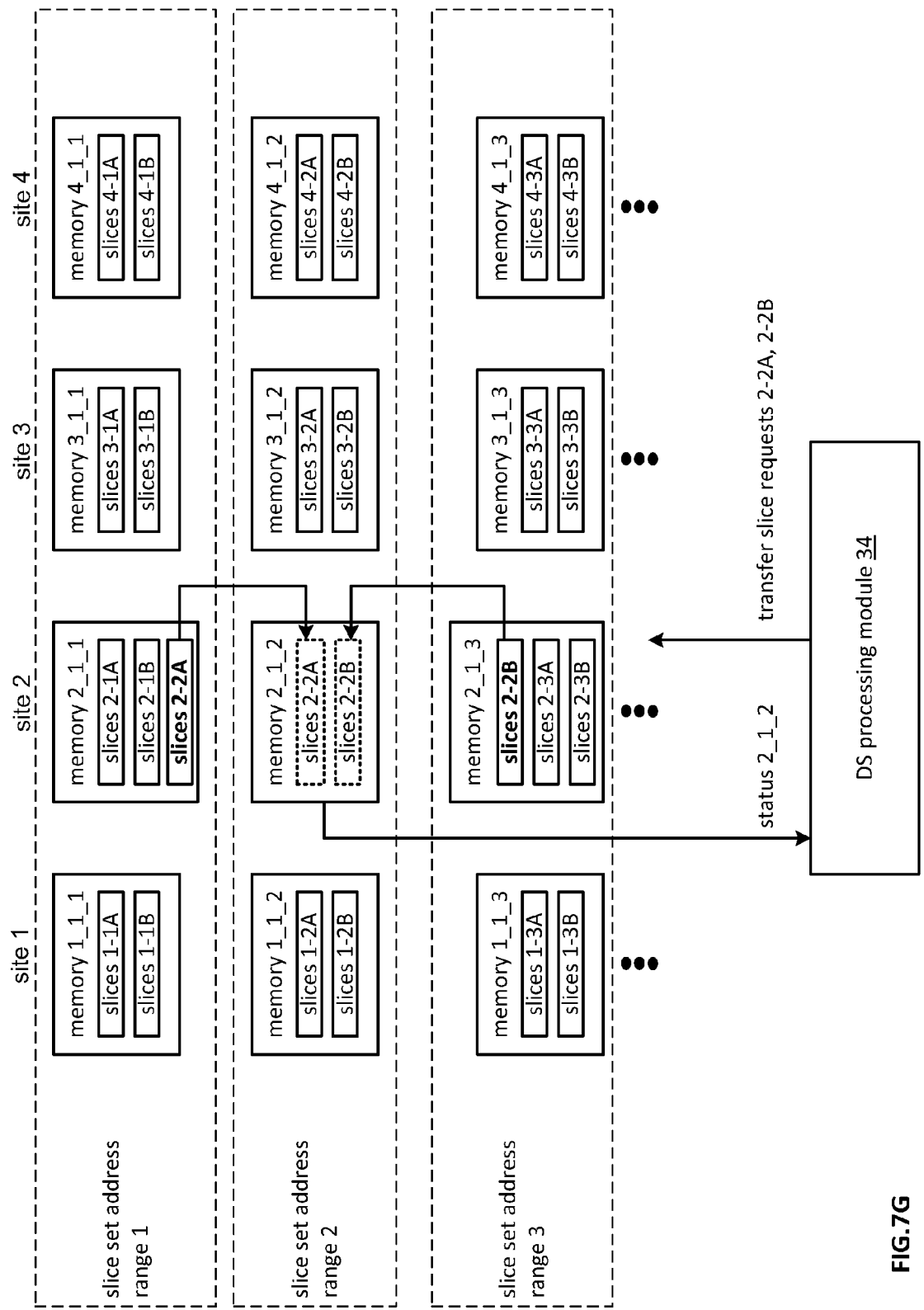
Figure 7H:
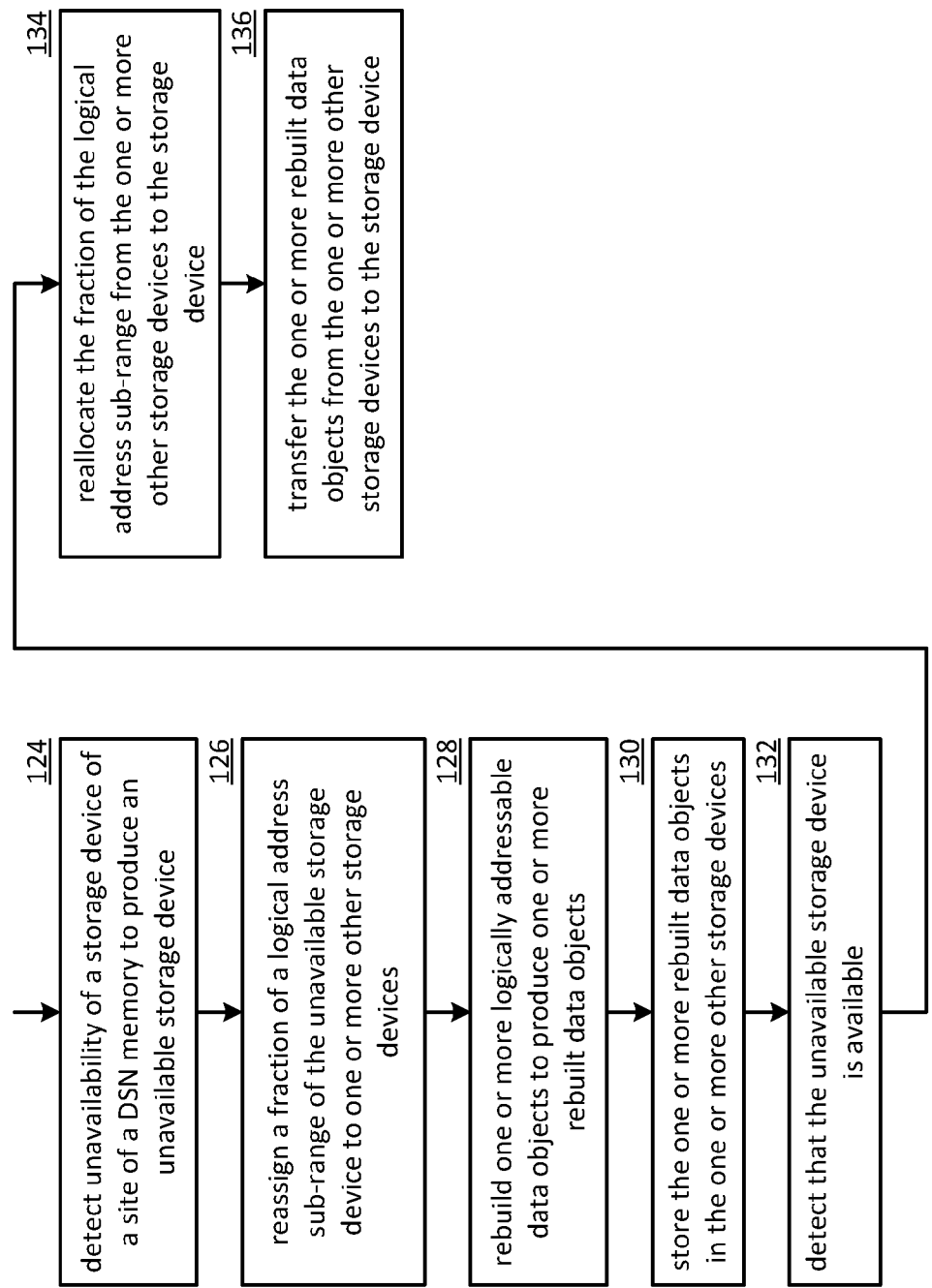
Figure 8:
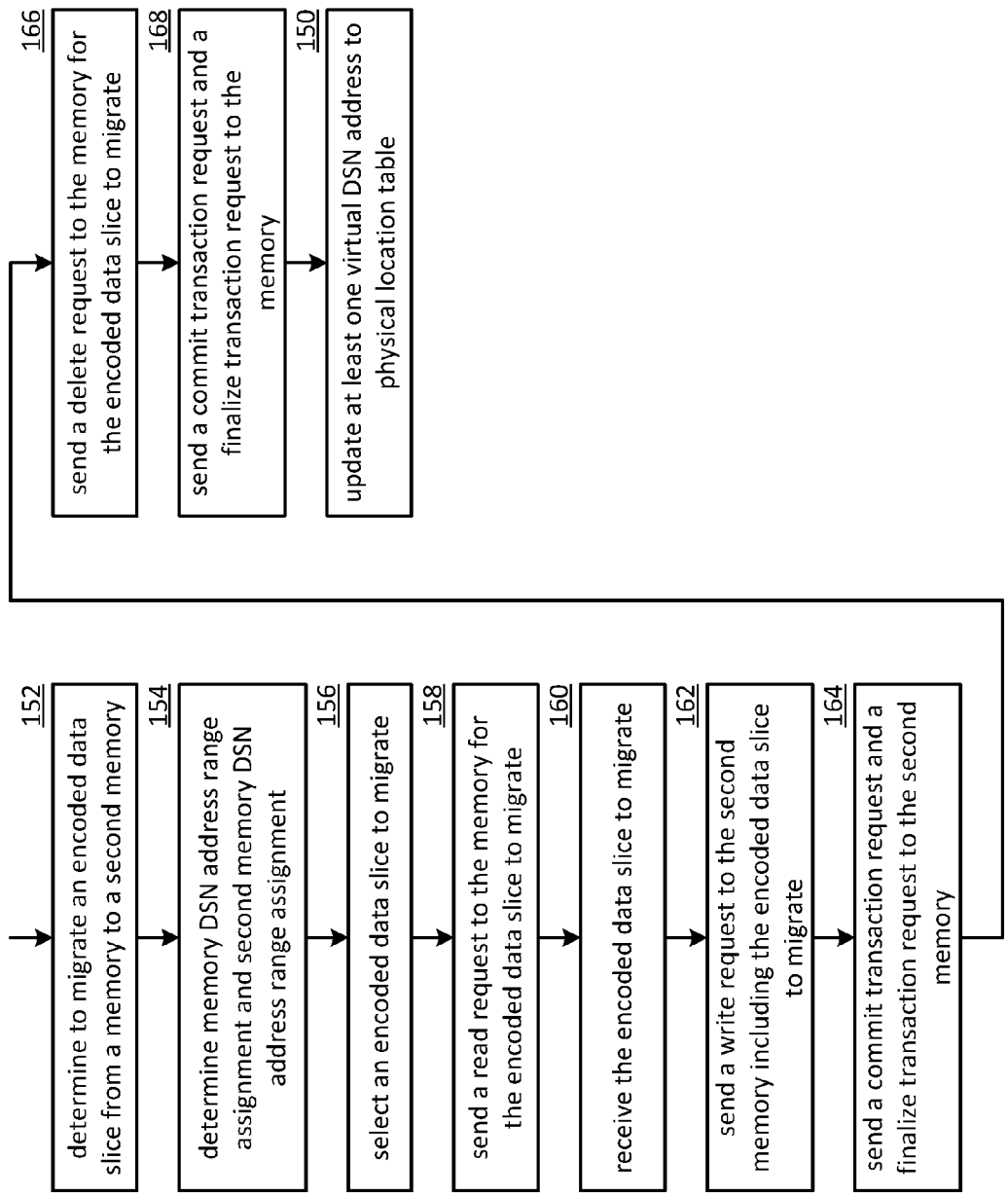
Figure 9A:
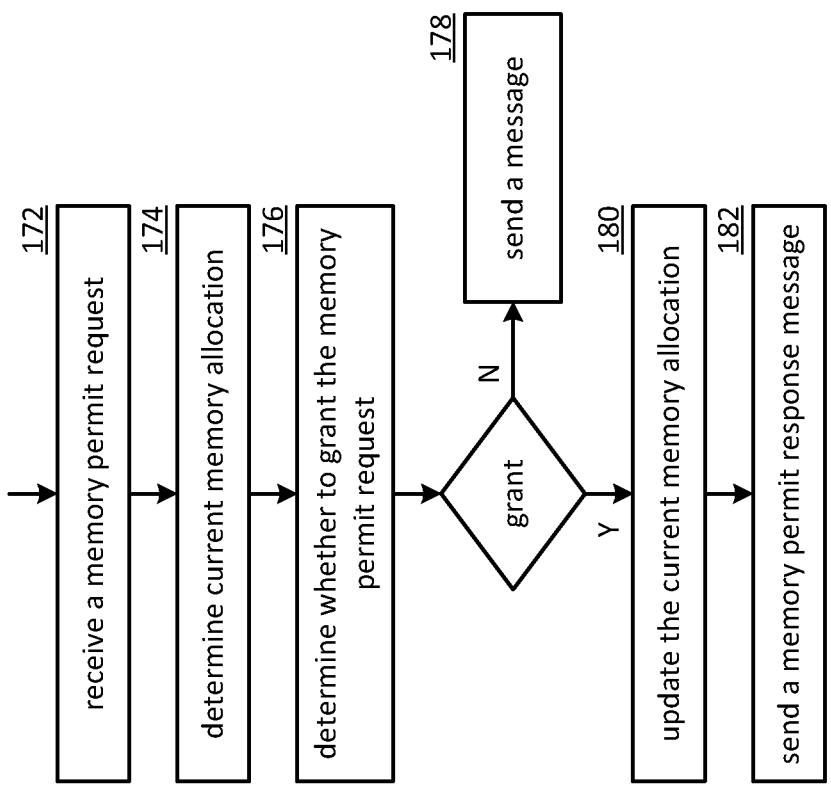

FIGS. 7E-G are schematic block diagrams of yet another embodiment of a dispersed storage network (DSN) illustrating alternative example steps of transferring data in accordance with the present invention;

FIG. 7H is a flowchart illustrating an example of transferring data in accordance with the present invention;

FIG. 8 is a flowchart illustrating another example of migrating encoded data slices in accordance with the invention;

FIG. 9A is a flowchart illustrating an example of utilizing memory in accordance with the invention;

FIG. 9B is a flowchart illustrating an example of encoding data in accordance with the invention;

FIG. 9C is a flowchart illustrating an example of decoding encoded data slices in accordance with the invention;

FIG. 10A is a flowchart illustrating an example of validating a request in accordance with the invention; and FIG. 10B is a flowchart illustrating an example of producing a request in accordance with the invention.

DETAILED DESCRIPTION OF THE INVENTION

Figure 1:
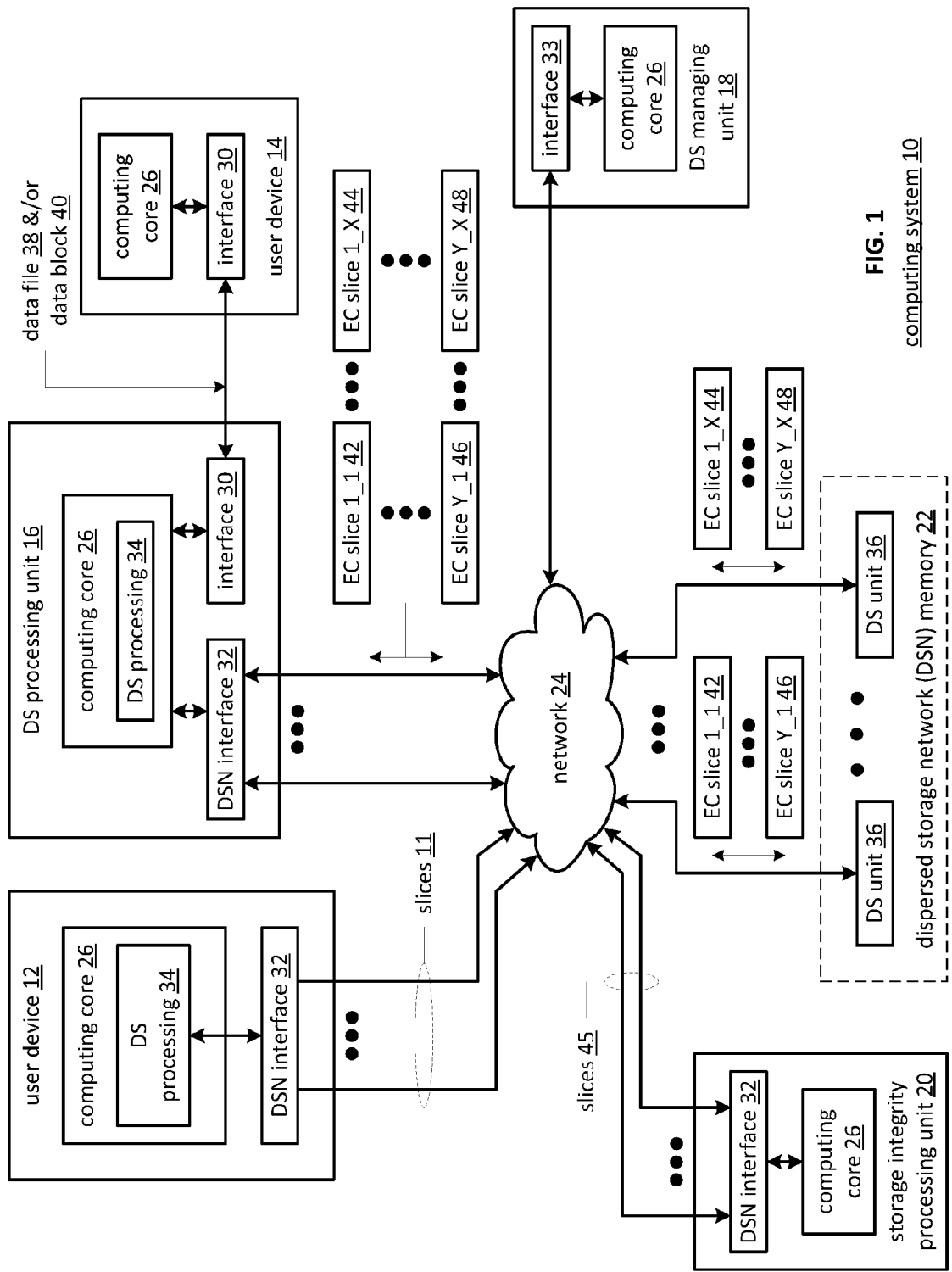
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-10B.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
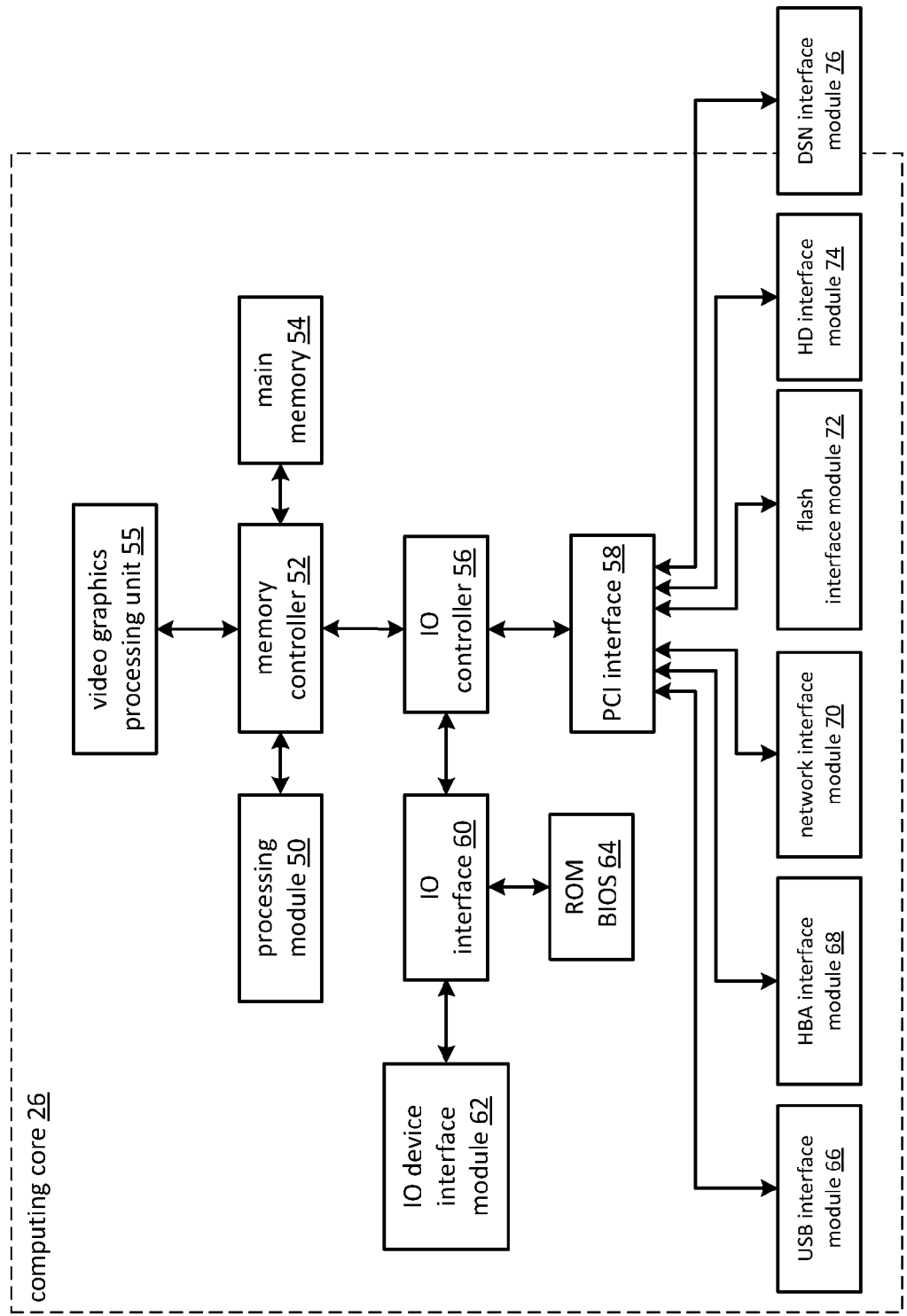
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
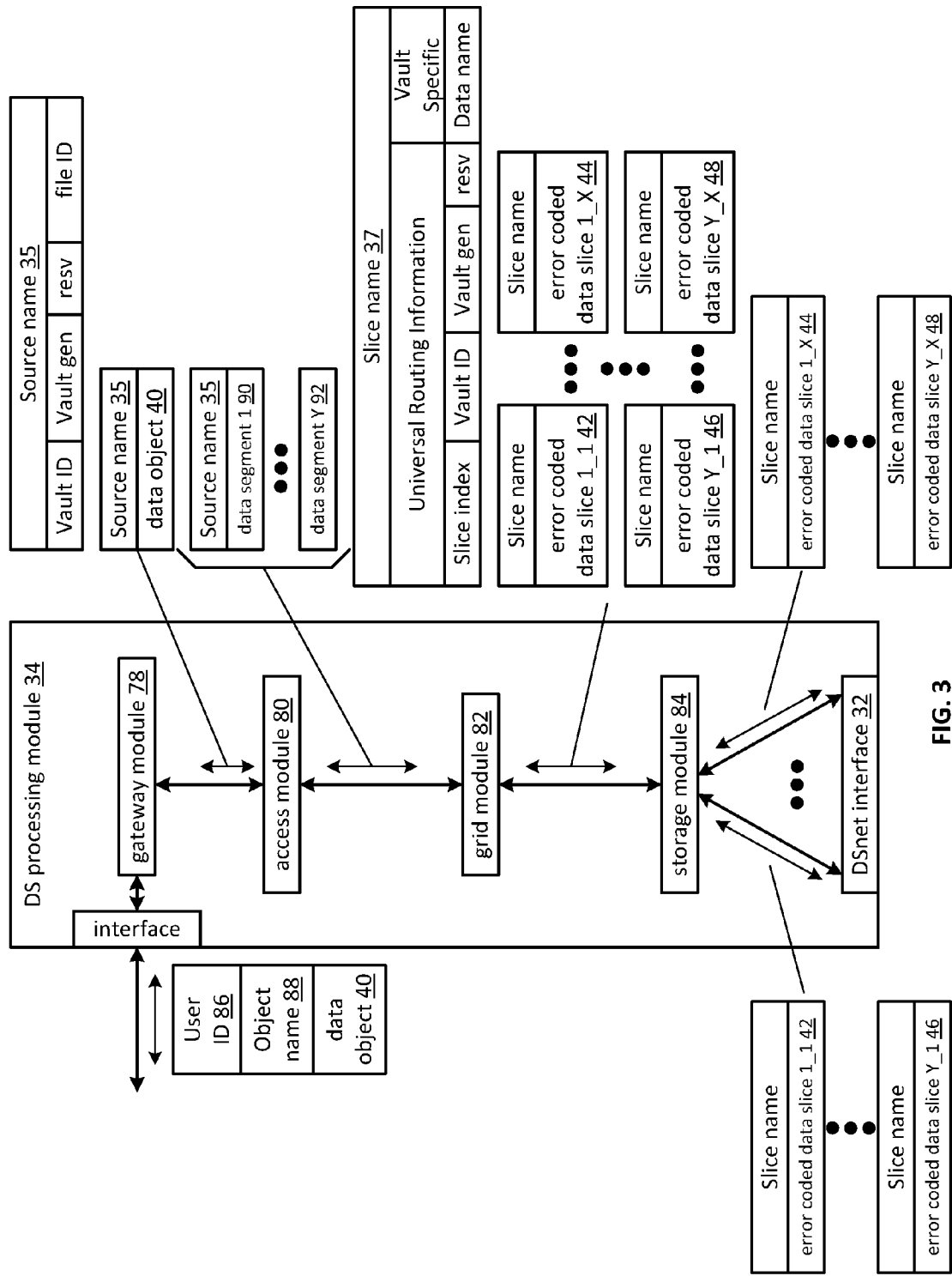
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
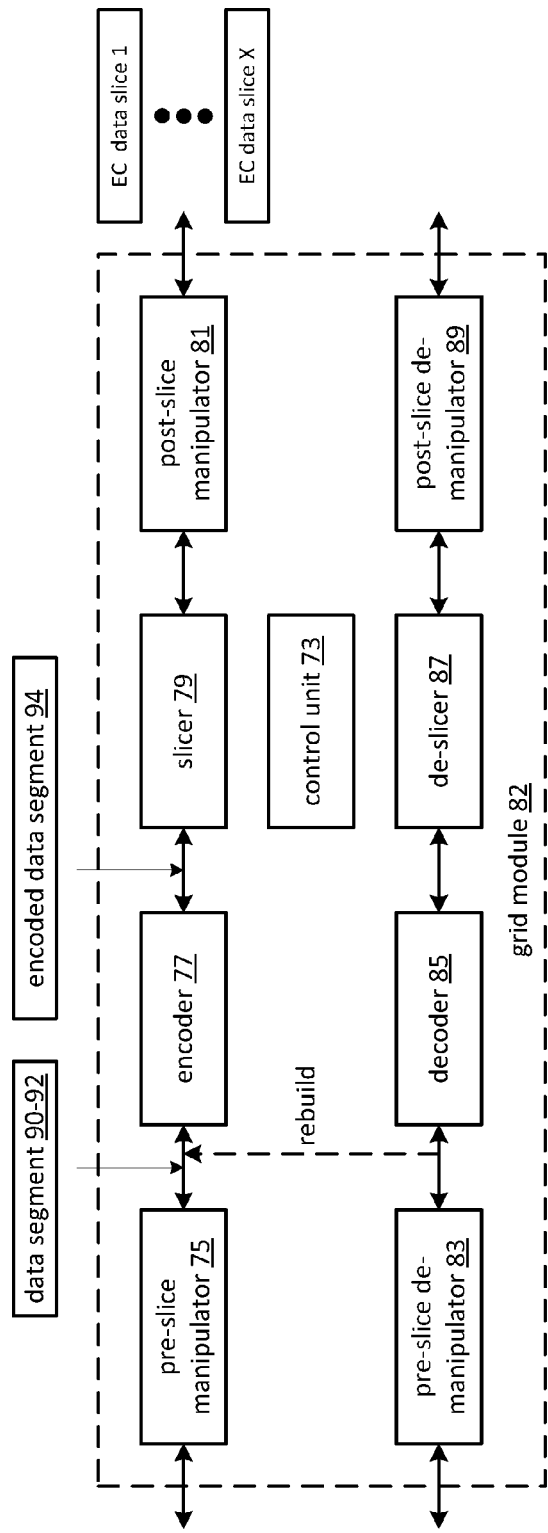
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
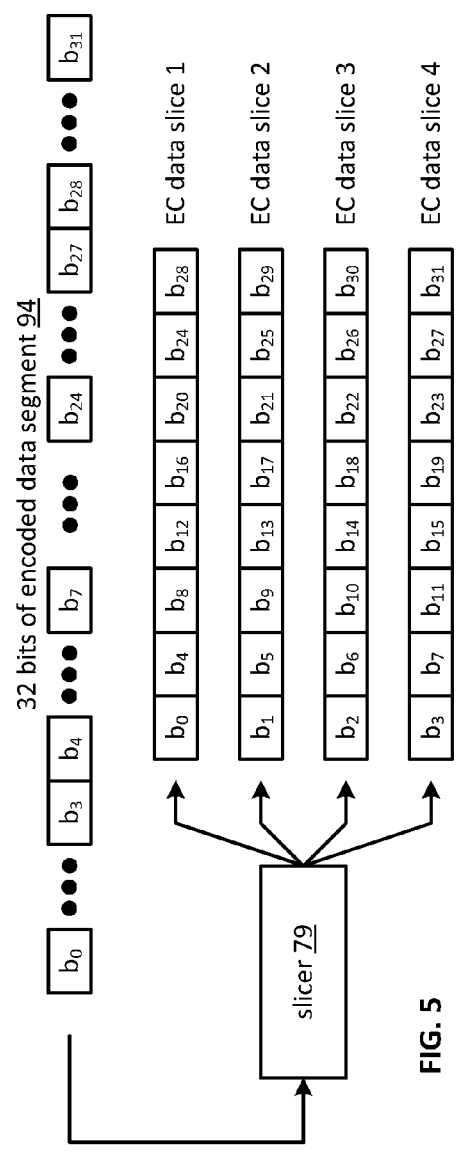
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6E:
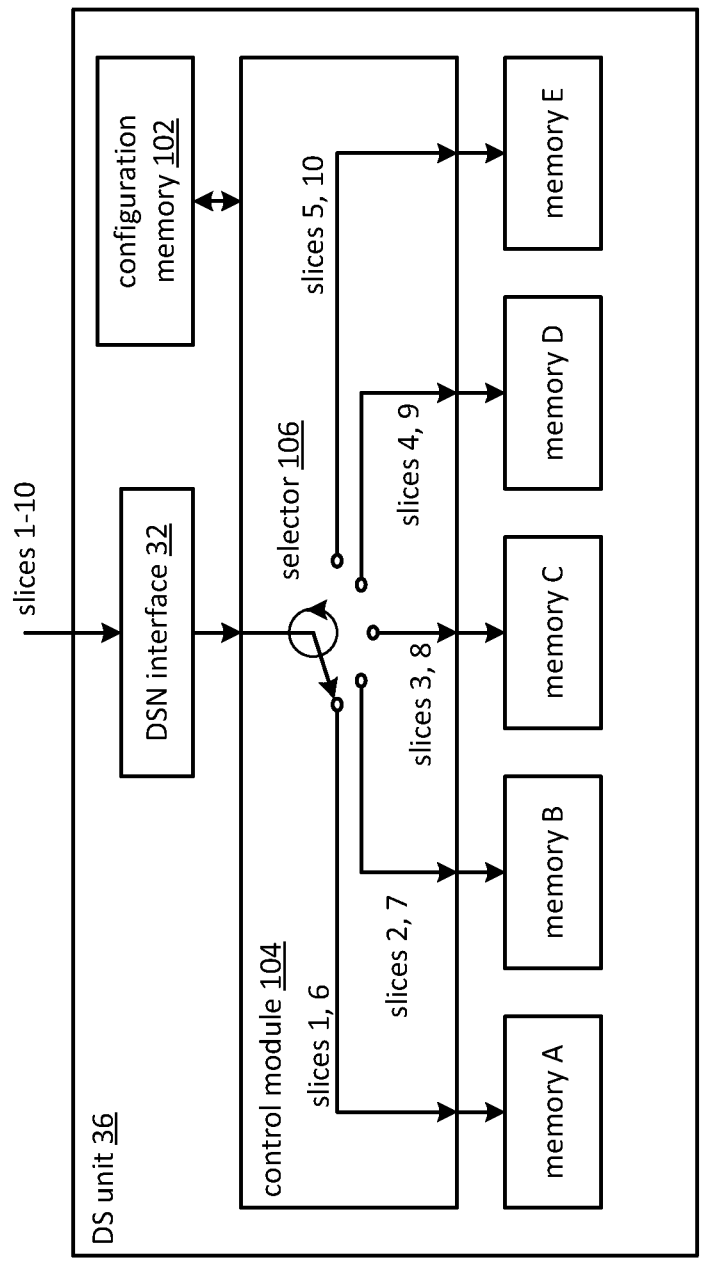
FIG. 6E is a schematic block diagram of another embodiment of a dispersed storage (DS) unit in accordance with the invention.

FIG. 6A is a schematic block diagram of an embodiment of a dispersed storage (DS) unit 36. The DS unit 36 includes a dispersed storage network (DSN) interface 32, a control module 104, a configuration memory 102, and a plurality of memories A-E. The control module may be implemented as logic in a computing core 26 and/or as a software algorithm operating on a computing core 26. A processing module of the control module may execute a method to control the plurality of memories A-E, stored encoded data slices in the plurality of memories A-E, retrieve encoded data slices from the plurality of memories, and utilize the configuration memory as a repository for configuration information (e.g., virtual DSN addressing range assignments for each of the memories) associated with the DS unit. Such a method is described in greater detail with reference to FIGS. 6B-6F. The configuration memory 102 and each memory of the plurality of memories A-E may be a read-only memory, random access memory, volatile memory, non-volatile memory, static memory, dynamic memory, flash memory, magnetic disk drive memory, solid state memory, cache memory, and/or any device that stores digital information. For example, the configuration memory 102 is implemented utilizing a solid-state flash memory and each of the plurality of memories A-E are implemented utilizing a magnetic disk drive memory.

As an example of initialization operation, the control module 104 receives a virtual DSN address range assignment message that includes an overall address range assignment for the DS unit 36. The control module 104 determines available memories as memories A-E based on one or more of configuration information retrieved from the configuration memory 102, an installation indicator, a query, and a message. The control module 104 determines subdivisions of the address range to assign to each of the plurality of memories A-E. For instance, the control module assigns address range 101-200 to memory A, address range 201-300 to memory B, address range 301-400 to memory C, address range 401-500 to memory D, and address range 501-600 to memory A when the overall address range assignment is 101-600. In such an instance, contiguous address ranges are assigned to the plurality of memories such that there are no gaps in address ranges. In the instance, each memory is assigned a uniform number of addresses within an address range assignment when an expected address range utilization is of a uniform nature. As another instance, the control module 104 assigns non-uniform address ranges to each of the memories A-E when the expected address range utilization is of a non-uniform nature. The control module 104 stores address range assignment information as configuration information in the configuration memory 102 (e.g., address range assignments by memory).

As an example of storage operation, the control module 104 receives a storage request via the DSN interface 32, wherein the request includes an encoded data slice and slice name. The control module 104 retrieves configuration information from the configuration memory 102. The control module 104 determines an assigned memory based on the slice name and the configuration information such that the slice name address falls within an address range associated with the assigned memory. The control module 104 stores the encoded data slice in the assigned memory and updates the configuration information with the slice name. Note that a memory of the plurality of memories A-E may be utilized to store more data slices than other memories when the slice names of successive storage requests fall within an address range associated with the memory. Note that an amount of available free space of each of the memories may vary over time. A memory utilization balancing method is discussed in greater detail with reference to FIGS. 6B-6F.

FIG. 6B is a diagram illustrating an example of free memory (e.g., available memory) availability for a plurality of memories. For example, the plurality of memories A-E may be implemented in a single dispersed storage (DS) unit. As another example, the plurality of memories A-E may be implemented in two or more DS units. As illustrated, memory A is 60% free (e.g., not utilized), memory B is 50% free, memory C is 30% free, memory D is 45% free, and memory E is 40% free. In such an example, memory C may have been utilized more often than other memories for data storage operations as memory C has a least amount of free space.

A rebalancing method may provide a memory utilization improvement wherein encoded data slices are migrated between one or more memories. Such a rebalancing method may determine how to migrate encoded data slices based on calculating a migration score for pairs of memories. For example, the migration score may be calculated as migration score (first memory, second memory)=|first memory free space−second memory free space|/min (first memory free space, second memory free space). For instance, migration score (memory A, memory B)=0.2, migration score (memory B, memory C)=0.667, migration score (memory C, memory D)=0.5, migration score (memory D, memory E)=0.125 based on memory free space for memories A-E as illustrated in FIG. 6B. Next, the migration score is compared to a migration threshold to determine whether the comparison is favorable. For example, the comparison is not favorable when the migration score of a memory pair is greater than migration threshold. For instance, the comparison is not favorable when the migration score (memory B, memory C)=0.667 and the migration threshold is 0.5. Alternatively, a memory pair may be selected for migration when an associated migration score is the highest of each migration score of the consecutive memory pairs. Next, encoded data slices may be moved from a memory with the least amount of free space of the memory pair to the other memory of the memory pair. For instance, encoded data slices may be moved from memory C to memory B to balance the memory utilization. Next, a configuration information update may indicate updated virtual dispersed storage network (DSN) address range assignments for the rebalanced memories such that the slice names of the encoded data slices that are associated with corresponding memories (e.g., where they are stored). The method to migrate encoded data slices is discussed in greater detail with reference to FIG. 6F.

FIG. 6C is a diagram illustrating another example of free memory availability for a plurality of memories subsequent to an encoded data slice migration as previously discussed with reference to FIG. 6B. As illustrated, memory A is 60% free memory B is 40% free, memory C is 40% free, memory D is 45% free, and memory E is 40% free. Note that memory B and memory C have 40% free as a result of rebalancing such a memory pair. The example continues such that a migration score may be calculated for each consecutive memory pair of the plurality of memories. For instance, migration score (memory A, memory B)=0.5, migration score (memory B, memory C)=0.0, migration score (memory C, memory D)=0.125, migration score (memory D, memory E)=0.125 based on memory free space for memories A-E as illustrated in FIG. 6C. As an example of rebalancing, a memory pair of memory A and memory B is selected for rebalancing based on that memory pair having a highest migration score=0.5 of the memory pairs.

As alternative example, the memory pair of memory A and memory B is selected for rebalancing based on the migration score of 0.5 being greater than a migration threshold when the migration threshold is 0.4. Next, encoded data slices are migrated from a memory with the least amount of free space of the memory pair to the other memory of the memory pair. For instance, encoded data slices are moved from memory B to memory A to balance the memory utilization. Next, a configuration information update indicates updated virtual dispersed storage network (DSN) address range assignments for the rebalanced memories such that the slice names of the encoded data slices that are associated with corresponding memories (e.g., where they are stored).

FIG. 6D is a diagram illustrating another example of free memory availability for a plurality of memories subsequent to an encoded data slice migration as previously discussed with reference to FIG. 6C. As illustrated, memory A is 50% free memory B is 50% free, memory C is 40% free, memory D is 45% free, and memory E is 40% free. Note that memory A and memory B have 50% free as a result of rebalancing such a memory pair. The example continues such that a migration score may be calculated for each consecutive memory pair of the plurality of memories (e.g., as previously discussed). For instance, migration score (memory A, memory B)=0.0, migration score (memory B, memory C)=0.25, migration score (memory C, memory D)=0.125, migration score (memory D, memory E)=0.125 based on memory free space for memories A-E as illustrated in FIG. 6D. As example of rebalancing, a memory pair of memory B and memory C is chosen for rebalancing based on that memory pair having a highest migration score=0.25 of the memory pairs.

As an alternative example, the memory pair of memory B and memory C is chosen for rebalancing based on the migration score of 0.25 being greater than a migration threshold when the migration threshold is 0.2. Next, encoded data slices are migrated from a memory with the least amount of free space of the memory pair to the other memory of the memory pair. For instance, encoded data slices are migrated from memory B to memory C to balance the memory utilization. Next, a configuration information update indicates updated virtual dispersed storage network (DSN) address range assignments for the rebalanced memories such that the slice names of the encoded data slices that are associated with corresponding memories (e.g., where they are stored).

FIG. 6E is a schematic block diagram of another embodiment of a dispersed storage (DS) unit. The DS unit 36 includes a dispersed storage network (DSN) interface 32, a control module 104, a configuration memory 102, and a plurality of memory devices A-E. The control module 104 includes a selector 106 to route a selected encoded data slice from a plurality of received encoded data slices to a selected memory of the memories A-E. The selected slice may be routed to the selected memory in accordance with at least one of a slice name addressing approach and a quantity load balancing function. The control module 104 determines the selected memory based on a slice name associated with the encoded data slice when the slice name addressing approach is utilized.

The control module 104 stores a plurality of encoded data slices in the plurality of memory devices A-E of a dispersed storage (DS) unit of a dispersed storage network (DSN) memory using the quantity load balancing function when the quantity load balancing function is utilized. The control module 104 stores the plurality of encoded data slices in the plurality of memory devices A-E using the quantity load balancing function to substantially balance a quantity of encoded data slices stored within each of the plurality of memory devices, wherein data size of at least some of the plurality of encoded data slices is different. The quantity load balancing includes at least one of a round robin even distribution approach by quantity of encoded data slices, an uneven distribution approach by quantity of encoded data slices (e.g., 2 slices to memory A for every 1 slice to memories B-E), and a skipping distribution approach by quantity of encoded data slices (e.g., 1 slice to memory A, no slices to memory B, and 1 slice to memories C-E).

As an example of operation, the DSN interface 32 receives encoded data slices 1-10. The DSN interface 32 forwards the encoded data slices 1-10 to the control module 104. The control module 104 determines the quantity load balancing function to include the round robin scheme of storage of the encoded data slices 1-10 evenly amongst the plurality of memory devices A-E based on a predetermination. The control module 104 controls the selector 106 to route the encoded data slice 1 to memory A, encoded data slice 2 to memory B, encoded data slice 3 to memory C, encoded data slice 4 to memory D, encoded data slice 5 to memory E, encoded data slice 6 to memory A, encoded data slice 7 to memory B, encoded data slice 8 to memory C, encoded data slice 9 to memory D, and encoded data slice 10 to memory E.

Figure 6F:
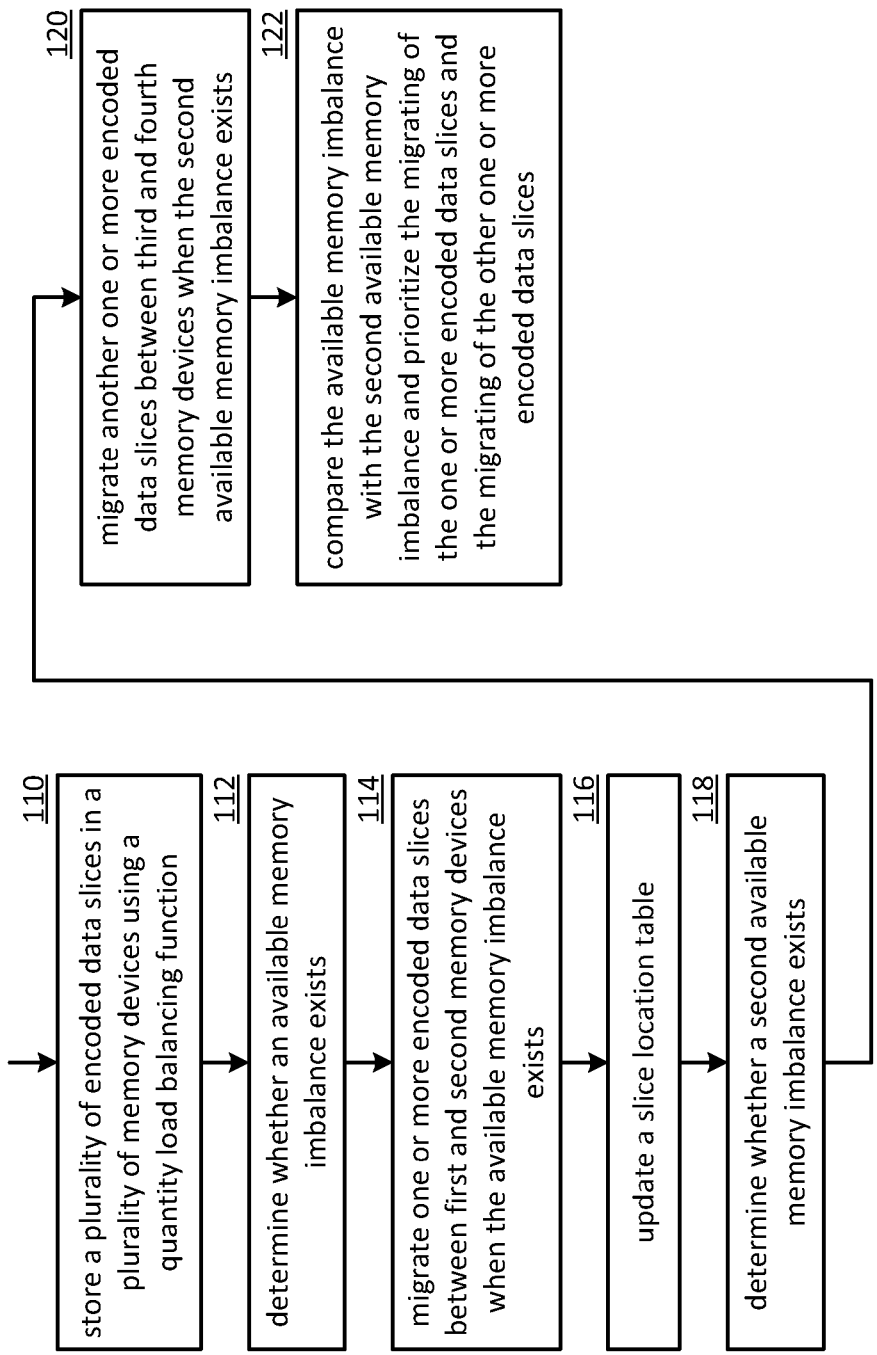
FIG. 6F is a flowchart illustrating an example of migrating encoded data slices in accordance with the invention.

FIG. 6F is a flowchart illustrating an example of migrating encoded data slices. The method begins with step 110 where a processing module (e.g., of a dispersed storage (DS) unit) stores a plurality of encoded data slices in a plurality of memory devices of a dispersed storage (DS) unit of a dispersed storage network (DSN) memory using a quantity load balancing function to substantially balance a quantity of encoded data slices stored within each of the plurality of memory devices, wherein data size of at least some of the plurality of encoded data slices is different.

The method continues at step 112 where the processing module determines whether an available memory imbalance exists between a first memory device of the plurality of memory devices and a second memory device of the plurality of memory devices. The determining whether the available memory imbalance exists includes determining an available memory value of the first memory device, determining an available memory value of the second memory device, determining a difference available memory value based on the available memory values of the first and second memory device, comparing the difference available memory value with an available memory differential threshold, and when the comparing the difference available memory value with the available memory differential threshold is unfavorable, indicating that the available memory imbalance exists. The available memory differential threshold may be very low such that any difference triggers a migration.

The determining the difference available memory value includes at least one of subtracting the available memory value of the first memory device from the available memory value of the second memory device to produce the difference available memory value and calculating a migration score based on a subtraction of the available memory value of the first memory device from the available memory value of the second memory device to produce an available memory resultant value and dividing the available memory resultant value from one of the available memory value of the first memory device and the available memory value of the second memory device. For example, the processing module may determine the migration score in accordance with a formula of: migration score=|the first memory availability level—the second memory availability level|/min (the first memory availability level, the second memory availability level).

The method continues at step 114, when the available memory imbalance exists, where the processing module migrates one or more encoded data slices between the first and second memory devices to reduce the available memory imbalance. The migrating the one or more encoded data slices between the first and second memory devices includes, when the available memory imbalance exists because an available memory value of the first memory device is less than an available memory value of the second memory device, selecting the one or more encoded data slices associated with the first memory for migration to produce a migration set of encoded data slices, retrieving the migration set of encoded data slices from the first memory, storing the migration set of encoded data slices in the second memory, modifying a first set of DSN addresses associated with the first memory device to produce a modified first set of DSN addresses, and modifying a second set of DSN addresses associated with the second memory device to produce a modified second set of DSN addresses.

The selecting the one or more encoded data slices includes determining a magnitude of the available memory imbalance, determining data size of the one or more encoded data slices, and selecting the one or more encoded data slices based on the magnitude of the available memory imbalance and the data size of the one or more encoded data slices. Alternatively, the selecting the one or more encoded data slices includes at least one of identifying encoded data slices based on an encoded data slice priority level and identifying encoded data slices based on an encoded data slice type indicator.

The method continues at step 116 where the processing module updates a slice location table based on the migrating the one or more encoded data slices between the first and second memory devices. The modifying the first set of DSN addresses to produce the modified first set of DSN addresses includes modifying the first set of DSN addresses to exclude DSN addresses associated with the migration set of encoded data slices. The modifying the second set of DSN addresses to produce the modified second set of DSN addresses includes modifying the second set of DSN addresses to include DSN addresses associated with the migration set of encoded data slices.

The method continues at step 118 where the processing module determines whether a second available memory imbalance exists between a third memory device of the plurality of memory devices and a fourth memory device of the plurality of memory devices. The method continues at step 120, when the second available memory imbalance exists, where the processing module migrates another one or more encoded data slices between the third and fourth memory devices to reduce the available memory imbalance.

The method continues at step 122 where the processing module compares the available memory imbalance with the second available memory imbalance and prioritizes the migrating of the one or more encoded data slices between the first and second memory devices and the migrating of the other one or more encoded data slices between the third and fourth memory devices based on the comparing. For example, the processing module prioritizes migrating the other one or more encoded data slices between the third and fourth memory devices when the second available memory imbalance includes an imbalance that is greater than the imbalance of the available memory imbalance. Alternatively, processing module considers imbalances of all possible pairings of memory devices to prioritize encoded data slice migration.

FIG. 7A is a schematic block diagram of an embodiment of a dispersed storage network (DSN) that includes a DSN memory implemented at four sites, the network 24 and the dispersed storage (DS) processing unit 16 of FIG. 1. The DS processing unit 16 includes the DS processing module 34 of FIG. 1. The DS processing module 34 may include further modules. For example, the DS processing module 34 provides a first module and a second module. The DSN memory implementation at each of the four sites includes a plurality of storage devices. Each storage device may be implemented utilizing one or more of a memory, a memory array, a disk drive, a solid-state drive, an optical disk drive, a magnetic disk drive, a storage unit, a DS unit, a distributed storage and task (DST) execution unit, and a storage server. For example, a first storage device includes DS unit 4_1 at the fourth site and a second storage device includes DS unit 4_2 at the fourth site. As another example, the first storage device includes a first memory 4_1_1 within the DS unit 4_1 and the second storage device includes a second memory 4_1_2 within the DS unit 4_1.

The DSN memory has a logical address range (e.g., DSN address range of slice names), where each of each site is assigned a logical address sub-range of the logical address range and each of the plurality of storage devices is assigned a unique fraction of a corresponding logical address sub-range in a storage device sequential manner (e.g., contiguous addressing from storage device to storage device of a common site). For example, when the storage devices includes DS units, a first set of DS units 1_1, 2_1, 3_1, and 4_1 are associated with a first part of the logical address range and a second set of DS units 1_2, 2_2, 3_2, and 4_2 are associated with a second part of the logical address range, where each DS unit is assigned a corresponding unique fraction of a corresponding logical address sub-range of an associated site.

In an example of operation, the first module, when operable within the DS processing unit 16, causes the DS processing module 34 to detect unavailability of a storage device of a site of the DSN memory to produce an unavailable storage device. As a specific example, when the memories are associated with the storage devices, the DS processing unit 16 receives an error message associated with memory 2_1_2 of DS unit 2_1 (e.g., or any one or more memory devices) indicating the unavailability of the storage device. As another specific example, when the DS units are associated with the storage devices, the DS processing unit 16 receives an error message associated with DS unit 3_2 indicating the unavailability of the storage device (e.g., unavailability of the entire DS unit (i.e., DS unit off-line), unavailability of one or more memory devices of a plurality of memory devices associated with the DS unit).

The second module, when operable within the DS processing unit 16, causes the DS processing module 34 to reassign, within the site, a fraction of a logical address sub-range of the unavailable storage device to one or more other storage devices of the plurality of storage devices of the site while maintaining a storage device sequential manner of allocating fractions of the logical address sub-range (e.g., issues address assignment messages, updates logical address-to-storage device tables). With the reassignment, the DS processing unit 16 rebuilds one or more logically addressable data objects (e.g., encoded data slices associated with slice names of the logical addressing stored in the unavailable storage device) to produce one or more rebuilt data objects (e.g., rebuilt encoded data slices). As a specific example, the DS processing module 34 retrieves a decode threshold number of slices 11 for each set of slices from other storage devices of a set of storage devices that includes the unavailable storage device, where the set of storage devices shares a common portion of the DSN memory logical address range.

Next, the DS processing module 34 decodes each decode threshold number of slices 11 to reproduce the one or more rebuilt data objects as the rebuilt encoded data slices. With the rebuilt data objects produced, the DS processing unit 16 stores the one or more rebuilt data objects in the one or more other storage devices. As a specific example, the DS processing module 34 stores a first portion of the rebuilt encoded data slices in memory 2_1_1 and a second portion of the rebuilt encoded data slices in memory 2_1_3 of DS unit 2_1 when the unavailable storage device is memory 2_1_2. As another specific example, the DS processing module stores the first portion of the rebuilt encoded data slices in DS unit 3_1 and the second portion of the rebuilt encoded data slices in DS unit 3_3 when the unavailable storage device is DS unit 3_2.

When the unavailable storage device becomes available (e.g., receive an availability indicator), the DS processing unit 16 reallocates the fraction of the logical address sub-range from the one or more other storage devices to the storage device (e.g., issues address assignment messages, updates the logical address-to-storage device tables). With the reallocation, the DS processing unit 16 transfers the one or more rebuilt data objects from the one or more other storage devices to the storage device. As a specific example, the DS processing module 34 retrieves the rebuilt encoded data slices from the one or more other storage devices and stores the retrieved rebuilt encoded data slices in the storage device. As another specific example, the DS processing module 34 issues a write commands to the one or more other storage devices to transfer the rebuilt encoded data slices to the storage device.

The method to detect the unavailability of the storage device, rebuild data objects, and transfer rebuilt data objects is discussed in greater detail with reference to FIGS. 7B-7G. In particular, FIGS. 7B-D discuss the detecting, the rebuilding, and the transferring when the storage devices are implemented as the DS units while FIGS. 7E-G discuss the detecting, the rebuilding, and the transferring when the storage devices are implemented as the memories.

FIGS. 7B-7D are schematic block diagrams of another embodiment of a dispersed storage network (DSN) illustrating example steps of transferring data. The DSN includes a dispersed storage (DS) processing module 34 and pluralities of storage devices implemented at a plurality of sites. The DS processing module 34 includes one or more of the decoder 85 and the encoder 77 of FIG. 4.

The other embodiment of the DSN further includes the example of FIG. 7A when the storage device is implemented as the dispersed storage (DS) unit. In particular, each site includes a plurality of DS units where logically addressable data objects are stored in the storage device sequential manner of allocating the fractions of the logical address sub-range. For example, the set of DS units 1_1, 2_1, 3_1, and 4_1 are associated with a slice set address range 1, the set of DS units 1_2, 2_2, 3_2, and 4_2 are associated with a slice set address range 2, etc. The slice set address range 1 is adjacent and sequential with the slice set address range 2 etc.

In an example of operation, when the unavailable storage device (e.g., DS unit 3_2) is detected, the DS processing module 34 rebuilds the one or more logically addressable data objects to produce one or more rebuilt data objects. As a specific example, the DS processing module 34 sends rebuilding requests to other sites regarding the one or more logically addressable data objects. For instance, the DS processing module 34 issues read slice requests to DS units 1_2, 2_2, and 4_2 to retrieve slices 1-2, 2-2, and 4-2 that are associated with the common slice set address range 2 of slices 3-2 associated with the unavailable storage device DS unit 3_2. As another instance, the DS processing module 34 issues partial slice requests to the DS units 1_2, 2_2, and 4_2 to receive partially encoded slices with respect to slices 3-2 to be rebuilt.

A DS unit generates a partially encoded slice by a series of steps. In a first step, an encoding matrix is obtained that was utilized to generate a slice to be rebuilt. In a second step, the encoding matrix is reduced to produce a square matrix that exclusively includes rows associated with the decode threshold number of partial encoded slices (e.g., DS units 1_2, 2_2, and 4_2). In a third step, the square matrix is inverted to produce an inverted matrix. In a fourth step, the inverted matrix is matrix multiplied with a slice associated with the DS unit to produce a vector. In a fifth step, the vector is matrix multiplied by a row of the encoding matrix corresponding to the slice to be rebuilt to produce the partially slice.

The decoder 85 receives, in response to the rebuilding requests, rebuilding data (e.g., a decode threshold number of slices or partially encoded slices). The decoder 85 decodes the rebuilding data to rebuild the one or more logically addressable data objects. For example, the decoder 85 decodes the decode threshold number of slices using a dispersed storage error coding function to produce rebuilt segments. As another example, the decoder 85 applies modulo addition (e.g., exclusive OR) to the decode threshold number of partial encoded slices two produce the rebuilt segments.

FIG. 7C illustrates a continuation of the example of transferring data. The DS processing module 34 reassigns, within the site, the fraction of the logical address sub-range of the unavailable storage device to one or more other storage devices of the plurality of storage device while maintaining the storage device sequential manner of allocating the fractions of the logical address sub-range. As a specific example, the DS processing module 34 divides the fraction of the logical address sub-range into a first portion and a second portion (e.g., slices 3-2-a and slices 3-2-b). Next, the DS processing module 34 reassigns the first portion to one of the one or more other storage devices having a first contiguous fraction of the logical address sub-range. For instance, the DS processing module 34 reassigns slices 3-2-a to DS unit 3_1 such that DS unit 3_1 now covers slice set address range 1 and the first portion of the slice set address range 2 with regards to addresses of the third site. Next, the DS processing module 34 reassigns the second portion (e.g., slices 3-2-b) to a second one of the one or more other storage devices (e.g., DS unit 3_3) having a second contiguous fraction of the logical address sub-range.

The DS processing module 34 completes rebuilding the one or more logically addressable data objects (e.g., slices 3-2) from the rebuilding data. As a specific example, encoder 77 encodes segments 2 using the dispersed storage error coding function to produce the slices 3-2-a and the slices 3-2-b. Having rebuilt the data objects, the DS processing module 34 stores the one or more rebuilt data objects in the one or more other storage devices. As a specific example, the encoder 77 facilitates storage of slices 3-2-a in DS unit 3_1 and facilitates storage of slices 3-2-b in DS unit 3_3. The facilitating includes sending one or more write requests to the one or more other storage devices regarding the one or more rebuilt data objects. A write request of the one or more write requests includes a logical address within the reassigned fraction of the logical address sub-range and a corresponding one of the one or more rebuilt data objects.

FIG. 7D illustrates a continuation of the example of transferring data. The DS processing module 34 detects that the unavailable storage device is available. As a specific example, the DS processing module 34 receives a status 3_2 from DS unit 3_2 indicating that a repair or replacement of the unavailable storage device has been completed. As another specific example, the DS processing module 34 receives the status 3_2 from DS unit 3_2 indicating that the unavailable storage device is coming back on-line. As yet another specific example, the DS processing module 34 receives the status 3_2 from DS unit 3_2 indicating that a repair or replacement of a memory device within the storage device has been completed.

When the DS processing module 34 detects that the unavailable storage device becomes available, the DS processing module 34 reallocates the fraction of the logical address sub-range from the one or more other storage devices to the storage device. For example, the DS processing module 34 issues a logical address assignment message to each of the DS units 3_1, 3_2, and 3_3 indicating that DS unit 3_1 is now associated with slice set address range 1, a DS unit 3_2 is now associated with slice set address range 2, and DS unit 3_3 is now associated with slice set address range 3.

Having reallocated the addresses, the DS processing module 34 transfers the one or more rebuilt data objects from the one or more other storage devices to the storage device. As a specific example, the DS processing module 34 issues one or more write commands to the one or more other storage devices to write the one or more rebuilt data objects to the storage device. For instance, the DS processing module 34 issues a write command to DS unit 3_1 to transfer slices 3-2-a to DS unit 3_2 and the DS processing module 34 issues a write command to DS unit 3_3 to transfer slices 3-2-b to DS unit 3_2. The DS processing module 34 receives an acknowledge of successful storage of the one or more rebuilt data objects by the storage device (e.g., one or more favorable write slice responses). The DS processing module 34 issues a delete command to the one or more other storage devices to delete the one or more rebuilt data objects. For example, the DS processing module 34 issues write slice requests indicating to delete slices 3-2-a to DS unit 3_1 and issues write slice requests indicating to delete slices 3-2-b to DS unit 3_3.

FIGS. 7E-G are schematic block diagrams of yet another embodiment of a dispersed storage network (DSN) illustrating alternative example steps of transferring data. The DSN includes the dispersed storage (DS) processing module 34 of FIGS. 7B-D and pluralities of storage devices implemented at a plurality of sites.

The other embodiment of the DSN further includes the example of FIG. 7A when the storage device is implemented as the memory. In particular, each site includes a plurality of DS units, each with a plurality of memories, where logically addressable data objects are stored in the storage device sequential manner of allocating the fractions of the logical address sub-range. For example, for a first set of DS units 1_1, 2_1, 3_1, and 4_1, a first set of memories 1_1_1, 2_1_1, 3_1_1, and 4_1_1 are associated with a slice set address sub-range 1, a second set of memories 1_1_2, 2_1_2, 3_1_2, and 4_1_2 are associated with a slice set address sub-range 2, etc. The slice set address sub-range 1 is adjacent and sequential with the slice set address sub-range 2 etc.

In an example of operation, when the unavailable storage device (e.g., memory 2_1_2) is detected, the DS processing module 34 rebuilds the one or more logically addressable data objects (e.g., slices 2-2A, 2-2B) to produce one or more rebuilt data objects. As a specific example, the DS processing module 34 sends rebuilding requests to other memories (e.g., to other DS units of the other memories at other sites) regarding the one or more logically addressable data objects. For instance, the DS processing module 34 issues read slice requests to memories 1_1_2, 3_1_2, and 4_1_2 to retrieve sets of slices 1-2A, 3-2A, and 4-2A and sets of slices 1-2B, 3-2B, and 4-2B that are associated with the common slice set address sub-range 2 of slices 2-2A, 2-2B associated with the unavailable storage device (e.g., memory 2_1_2). As another instance, the DS processing module 34 issues partial slice requests to the memories 1_1_2, 3_1_2, and 4_1_2 to receive partially encoded slices with respect to slices 2-2A, 2-2B to be rebuilt.

The decoder 85 receives, in response to the rebuilding requests, rebuilding data (e.g., a decode threshold number of slices or partially encoded slices). The decoder 85 decodes the rebuilding data to rebuild the one or more logically addressable data objects. For example, the decoder 85 decodes the decode threshold number of slices per set of slices 1-2A, 3-2A, and 4-2A using a dispersed storage error coding function to produce rebuilt segments 2A. As another example, the decoder 85 applies modulo addition (e.g., exclusive OR) to the decode threshold number of partial encoded slices two produce the rebuilt segments.

FIG. 7F illustrates a continuation of the alternative example of transferring data. The DS processing module 34 reassigns, within the site, the fraction of the logical address sub-range of the unavailable storage device to one or more other storage devices of the plurality of storage device while maintaining the storage device sequential manner of allocating the fractions of the logical address sub-range. As a specific example, the DS processing module 34 divides the fraction of the logical address sub-range into a first portion and a second portion (e.g., slices 2-2A and slices 2-2B). Next, the DS processing module 34 reassigns the first portion to one of the one or more other storage devices having a first contiguous fraction of the logical address sub-range. For instance, the DS processing module 34 reassigns slices 2-2A to memory 2_1_1 such that memory 2_1_1 now covers slice set address sub-range 1 and the first portion of the slice set address sub-range 2 with regards to addresses of the second site. Next, the DS processing module 34 reassigns the second portion (e.g., slices 2-2B) to a second one of the one or more other storage devices (e.g., memory 2_1_3) having a second contiguous fraction of the logical address sub-range.

The DS processing module 34 completes rebuilding the one or more logically addressable data objects (e.g., slices 2-2A, 2-2B) from the rebuilding data. As a specific example, encoder 77 encodes segments 2A using the dispersed storage error coding function to produce the slices 2-2A and encodes segments 2B to produce the slices 2-2B. Having rebuilt the data objects, the DS processing module 34 stores the one or more rebuilt data objects in the one or more other storage devices. As a specific example, the encoder 77 facilitates storage of slices 2-2A-a in the memory 2_1_1 and facilitates storage of slices 2-2B in the memory 2_1_3. The facilitating includes sending one or more write requests to the one or more other storage devices regarding the one or more rebuilt data objects. A write request of the one or more write requests includes a logical address within the reassigned fraction of the logical address sub-range and a corresponding one of the one or more rebuilt data objects.

FIG. 7G illustrates a continuation of the alternative example of transferring data. The DS processing module 34 detects that the unavailable storage device is available. As a specific example, the DS processing module 34 receives a status 2_1_2 from DS unit 2_1 indicating that a repair or replacement of the memory device 2_1_2 has been completed. As another specific example, the DS processing module 34 receives the status 2_1_2 from DS unit 2_1 indicating that the unavailable storage device is coming back on-line.

When the DS processing module 34 detects that the unavailable storage device becomes available, the DS processing module 34 reallocates the fraction of the logical address sub-range from the one or more other storage devices to the storage device. For example, the DS processing module 34 issues a logical address assignment message to DS units 2_1 indicating that memory 2_1_1 is now associated with slice set address sub-range 1, memory 2_1_2 is now associated with slice set address sub-range 2, and memory 2_1_3 is now associated with slice set address sub-range 3.

Having reallocated the addresses, the DS processing module 34 transfers the one or more rebuilt data objects from the one or more other storage devices to the storage device. As a specific example, the DS processing module 34 issues one or more write commands to the one or more other storage devices to write the one or more rebuilt data objects to the storage device. For instance, the DS processing module 34 issues a write command (e.g., transfer slice request) to DS unit 2_1 to transfer slices 2-2A from memory 2_1_1 to memory 2_1_2 and the DS processing module 34 issues a write command to DS unit 2_1 to transfer slices 2-2B from memory 2_1_3 to memory 2_1_2. The DS processing module 34 receives an acknowledge of successful storage of the one or more rebuilt data objects by the storage device (e.g., one or more favorable write slice responses). The DS processing module 34 issues a delete command to the one or more other storage devices to delete the one or more rebuilt data objects. For example, the DS processing module 34 issues write slice requests to DS unit 2_1 indicating to delete slices 2-2A from memory 2_1_1 and to delete slices 2-2B from memory 2_1_3.

FIG. 7H is a flowchart illustrating an example of transferring data. The method begins at step 124 where a processing module (e.g., of a dispersed storage (DS) processing unit of a dispersed storage network (DSN)) detects unavailability of a storage device of a site of DSN memory to produce an unavailable storage device. The DSN memory includes a plurality of sites that includes the site. The site includes a plurality of storage devices that includes the storage device. The DSN memory has a logical address range, where the site is assigned a logical address sub-range of the logical address range and each of the plurality of storage devices is assigned a fraction of the logical address sub-range in a storage device sequential manner. As a specific example, the processing module detects unavailability of one or more memory devices of a plurality of memory devices associated with the storage device (e.g., receive an error message associated with the one or more memory devices). As another specific example, the processing module detects that the storage device is off-line (e.g., no responses are received within a response timeframe subsequent to issuing a request to the storage device).

When the unavailable storage device is storing one or more logically addressable data objects (e.g., encoded data slices), the method continues at step 126 where the processing module reassigns, within the site, the fraction of the logical address sub-range of the unavailable storage device to one or more other storage devices of the plurality of storage device while maintaining the storage device sequential manner of allocating the fractions of the logical address sub-range. As a specific example, the processing module divides the fraction of the logical address sub-range into a first portion and a second portion (e.g., evenly), reassigns the first portion to one of the one or more other storage devices having a first contiguous fraction of the logical address sub-range, and reassigns the second portion to a second one of the one or more other storage devices having a second contiguous fraction of the logical address sub-range. The reassigning includes at least one of issuing a reassignment message to the one or more other storage devices, where the reassignment message includes an indication of the first and second portions, and updating a system DSN memory logical address range assignment table.

The method continues at step 128 where the processing module rebuilds the one or more logically addressable data objects to produce one or more rebuilt data objects. As a specific example, the processing module sends rebuilding requests to other sites regarding the one or more logically addressable data objects. For instance, the processing module issues read slice requests to a decode threshold number of storage devices of a set of storage devices that includes the unavailable storage device. Next, the processing module receives, in response to the rebuilding requests, rebuilding data. For instance, the processing module receives a decode threshold number of encoded data slices for each set of encoded data slices that includes an encoded data slice as one of the one or more logically addressable data objects. Having received the rebuilding data, the processing module rebuilds the one or more logically addressable data objects from the rebuilding data. For instance, the processing module decodes the decode threshold number of encoded data slices using a dispersed storage error coding function to reproduce a data segment. Next, the processing module encodes the data segment using the dispersed storage error coding function to reproduce a rebuilt encoded data slice associated with the unavailable storage device.

The method continues at step 130 where the processing module stores the one or more rebuilt data objects in the one or more other storage devices. As a specific example, the processing module sends one or more write requests to the one or more other storage devices regarding the one or more rebuilt data objects, where a write request of the one or more write requests includes a logical address within the reassigned fraction of the logical address sub-range and a corresponding one of the one or more rebuilt data objects. For instance, the processing module sends a write slice request that includes the rebuilt encoded data slice to another storage device that has been reassigned a fraction of the logical address sub-range that corresponds to the rebuilt encoded data slice.

The method continues at step 132 where the processing module detects that the unavailable storage device is available. As a specific example, the processing module detects that the unavailable storage device is available based on a repair or replacement of the unavailable storage device (e.g., receiving a configuration message). As another specific example, the processing module detects that the unavailable storage device is available based on the unavailable storage device coming back on-line (e.g., receiving a favorable response to a request within a response timeframe). As yet another specific example, the processing module detects that the unavailable storage device is available based on a repair or replacement of a memory device within the storage device (e.g., receiving an installation message).

When the unavailable storage device becomes available, the method continues at step 134 where the processing module re-allocates the fraction of the logical address sub-range from the one or more other storage devices to the storage device (e.g., issuing reassignment messages, updating the system DSN memory logical address range assignment table). The method continues at step 136 where the processing module transfers the one or more rebuilt data objects from the one or more other storage devices to the storage device. As a specific example, the processing module issues one or more write commands (e.g., a transfer instruction message) to the one or more other storage devices to write the one or more rebuilt data objects to the storage device. The processing module receives an acknowledge of successful storage of the one or more rebuilt data objects by the storage device. Next, the processing module issues a delete command to the one or more other storage devices to delete the one or more rebuilt data objects.

FIG. 8 is a flowchart illustrating another example of migrating encoded data slices, which includes similar steps to FIG. 7B. The method begins with step 152 where a processing module (e.g., of a dispersed storage (DS) processing unit) determines to migrate an encoded data slice from a memory to a second memory. The memory and the second memory may be included as memories of a dispersed storage (DS) unit. The processing module may determine to migrate a plurality of encoded data slices. The determination may be based on one or more of a migration score, a migration threshold, a memory free space indicator, a message, a predetermination, a failed memory indicator, and a new in-service memory indicator. For example, the processing module determines to migrate the encoded data slice from the memory to the second memory when the processing module determines that a migration score associated with the first and second memories is above a migration threshold.

The method continues at step 154 where the processing module determines memory dispersed storage network (DSN) address range assignment and second memory DSN address range assignment. The determination may be based on one or more of a number of encoded data slices to migrate, a system-wide virtual DSN address to physical location table lookup, a local virtual DSN to physical location table lookup, a message, and a list. For example, the processing module determines the memory DSN address range assignment and the second memory DSN address range assignment to move a boundary between the address ranges by one slice name corresponding to the encoded data slice to migrate.

The method continues at step 156 where the processing module selects an encoded data slice to migrate. For example, the encoded data slice to migrate may be a first encoded data slice to migrate of a plurality of encoded data slices. As another example, the encoded data slice to migrate may be a next encoded data slice to migrate of the plurality of encoded data slices. The method continues at step 158 where the processing module sends a read request message to a memory corresponding to the encoded data slice to migrate (e.g., including an associated slice name).

The method continues at step 160 where the processing module receives the encoded data slice to migrate. The method continues at step 162 where the processing module sends a write request message to the second memory that includes the encoded data slice to migrate and the associated slice name. The method continues at step 164 where the processing module sends a commit transaction request message and a finalize transaction request message to the second memory to facilitate storing the encoded data slice in the second memory. Alternatively, the processing module may send the commit transaction request message upon receiving a favorable write response message in response to the sending of the write request message to the second memory.

The method continues at step 166 where the processing module sends a delete request message to the memory that includes the slice name of the encoded data slice to migrate. Alternatively, the processing module may send the delete request message upon receiving a favorable commit transaction response message in response to sending the commit transaction request message to the second memory. The method continues at step 168 where the processing module sends a commit transaction request message and a finalize transaction request message to the memory to finish deleting the encoded data slice to migrate. Alternatively, the processing module sends the commit transaction request message upon receiving a favorable delete response message in response to sending of the delete request message to the memory. The method continues at step 150 of FIG. 7B where the processing module updates at least one virtual DSN address to physical location table (e.g., the slice name associated with the encoded data slice to migrate is moved from the address range of the memory to the address range of the second memory).

In addition, the processing module may form a virtual storage unit for the memory in the second memory such that read requests and write requests are coordinated while the migration of the encoded data slice is executed. In such a virtual store arrangement, simultaneous reads and writes to the memory and second memory may be prohibited to avoid synchronization issues. For instance, only one store slice request is executed at a time when two or more store slice requests are received for the memory and the second memory. As another instance, only one retrieve slice request is executed at a time when two or more retrieve slice requests are received for the memory and the second memory.

FIG. 9A is a flowchart illustrating an example of utilizing memory. The method begins with step 172 where a processing module (e.g., of a dispersed storage (DS) processing unit) receives a memory permit request (e.g., from a user device). A memory permit may be utilized to restrict utilization of a limited amount of local processing memory of a computing core as is discussed in greater detail with reference to FIGS. 9A-9C. A memory permit may include one or more of a user identifier, a data type indicator, an amount of memory requested indicator, an expected time duration, and a user device performance history indicator. The method continues at step 174 where the processing module determines current memory allocation. The current memory allocation may include one or more of a number of currently active permits, an amount of memory indicator allocated to currently active permits, an active memory utilization indicator, and an available memory indicator. The determination may be based on one or more of a permit table lookup, a predetermination, a list, a message, a user device query, and a DS unit query.

The method continues at step 176 where the processing module determines whether to grant the memory permit request. The determination may be based on one or more of the memory permit request, the current memory allocation, a maximum number of active permits threshold, a maximum amount of memory allocated to currently active permits threshold, an available memory threshold, and a DS unit performance history. For example, the processing module determines to grant the memory permit request when an amount of available memory is greater than an amount of memory requested and the number of active permits is less than the maximum number of active permits threshold. The method branches to the step where the processing module updates the current memory allocation when the processing module determines to grant the memory permit request. The method branches to step 180 when the processing module determines to grant the memory permit request. The method continues to step 178 when the processing module determines to not grant the memory permit request. The method continues at step 178 where the processing module sends a message. The message may include one or more of the memory permit request, a user identifier, an allowable amount of memory, and instructions to re-request. The processing module may send the message to a requesting entity. Alternatively, or in addition to, the processing module may send the message to a DS managing unit.

The method continues at step 180 where the processing module updates the current memory allocation when the processing module determines to grant the memory permit request. For example, the processing module increments the number of currently active permits indicator and updates the memory allocated to currently active permits indicator to include an amount of memory allocated. For example, the amount of memory allocated is substantially the same as the amount of memory requested. As another example, the amount of memory allocated is less than the amount of memory requested. The method continues at step 182 where the processing module sends a memory permit response message to the requesting entity. The memory permit response message may include one or more of user identity, the memory permit request, a memory permit identifier, the amount of memory allocated (e.g., granted), and a time duration of the memory permit. Data storage and retrieval methods utilizing the memory permit are discussed in greater detail with reference to FIGS. 9B-9C.

FIG. 9B is a flowchart illustrating an example of encoding data. The method begins with step 184 where a processing module (e.g., of a dispersed storage (DS) processing unit) receiving a data storage request (e.g., from a user device). The data storage request may include one or more of a memory permit identifier (ID), data, a user ID, a data size indicator, and a data type indicator. The method continues at step 186 where the processing module determines a memory permit associated with the data storage request. The determination may be based on one or more of the memory permit ID included in the data storage request, the user ID, a memory permit table lookup, and a message.

The method continues at step 188 where the processing module determines a system capability. The system capability may include one or more of available read/write bandwidth to dispersed storage (DS) units, available processing memory, available storage memory and a system loading indicator. The determination may be based on one or more of a performance history indicator, a test, a query, a message, and a list. For example, the processing module determines the available read/write bandwidth to DS units based on retrieving the performance history indicator from a local memory.

The method continues at step 190 where the processing module determines data storage parameters. The data storage parameters may include one or more of a slicing pillar width, a decode threshold, a number of write requests queued at once, a number of slices per write request, and a data segment size. The determination may be based on one or more of the memory permit, the system capability, a performance goal, available processing memory, a list, and a message. For example, the processing module determines a smaller data segment size when the processing module determines that the system capability is less than average.

The method continues at step 192 where the processing module dispersed storage error encodes data to produce encoded data slices in accordance with the data storage parameters. For example, the processing module encodes the data to produce a data segment size as determined by the data storage parameters to accommodate currently available processing memory and read/write bandwidth to the DS units. The method continues at step 194 where the processing module sends the encoded data slices to a dispersed storage network (DSN) memory in accordance with the data storage parameters for storage therein. For example, the processing module queues a small number of write requests messages to send to DS units of the DSN memory when the data storage parameters indicate a low number of write requests queued at once.

FIG. 9C is a flowchart illustrating an example of decoding encoded data slices, which include similar steps to FIG. 9B. The method begins with step 196 where a processing module (e.g., of a dispersed storage (DS) processing unit) receives a data retrieval request from a requesting entity (e.g., from a user device). The data retrieval request may include one or more of a memory permit identifier (ID), a user ID, a data size indicator, and a data type indicator. The method continues at step 198 where the processing module determines a memory permit associated with the data retrieval request. The determination may be based on one or more of the memory permit ID included in the data retrieval request, the user ID, a memory permit table lookup, and a message. The method continues at step 188 of FIG. 9B where the processing module determines a system capability.

The method continues at step 202 where the processing module determines data retrieval parameters. The data retrieval parameters may include one or more of a slicing pillar width, a decode threshold, a number of read requests queued at once, a number of slices per read request, how many data segments to reproduce once, and a data segment size. The determination may be based on one or more of the memory permit, the system capability, a performance goal, available processing memory, a list, and a message. For example, the processing module determines to simultaneously reproduce fewer data segments at once when the processing module determines that the system capability is less than average.

The method continues at step 204 where the processing module sends a plurality of read requests messages to a dispersed storage network (DSN) memory in accordance with the data retrieval parameters to retrieve a plurality of encoded data slices. For example, the processing module sends fewer simultaneous requests messages to DS units of the DSN memory when the data retrieval parameters indicate to simultaneously reproduce fewer data segments at once.

The method continues at step 206 where the processing module dispersed storage error decodes the plurality of encoded data slices to produce at least a portion of data in accordance with the data retrieval parameters. For example, the processing module decodes three sets of encoded data slices to reproduce three data segments as the data portion in accordance with the data retrieval parameters and system capability. The method continues at step 208 where the processing module sends the at least the portion of data to the requesting entity. The method may repeat to reproduce all portions of the data and to send all portions of the data to the requesting entity.

FIG. 10A is a flowchart illustrating an example of validating a request. The method begins with step 210 where the processing module (e.g., of a server, of a dispersed storage (DS) unit) receives a challenge request token from a requesting entity (e.g., a client, a user device). The challenge request token may include at least one of a client challenge and a client certificate chain, wherein the client certificate chain includes a client public key. The method continues at step 212 where the processing module determines whether the challenge request token is trusted. The processing module determines that the challenge request token is trusted when successfully matching at least one certificate authority identifier within the client certificate chain to a known certificate authority identifier (e.g., from a local known certificate authority list). The method branches to step 216 when the processing module determines that the challenge request token is trusted. The method continues to step 214 when the processing module determines that the challenge request token is not trusted. The method continues at step 214 where the processing module sends an error message indicating that the challenge process has failed. The processing module may send the error message to one or more of a user device, a requesting entity, and a DS managing unit.

The method continues at step 216 where the processing module sends a challenge response token when the processing module determines that the challenge request token is trusted. The challenge response token includes at least one of a server challenge, a server certificate chain, and a signature (e.g., a cryptographic hash utilizing an industry standards such as digital signature algorithm (DSA) or Rivest, Shamir, Adleman (RSA)) over the client challenge, the client certificate chain, the server challenge, and the server certificate chain utilizing a server private key (e.g., of a public key infrastructure (PKI) approach). The method continues at step 218 where the processing module receives a complete request token. The complete request token includes one or more of a client signature over the client challenge, the client certificate chain, the server challenge, and the server certificate chain.

The method continues at step 220 where the processing module determines whether the complete request token is valid. The processing module determines that the complete request token is valid when verifying the client signature utilizing the client public key received in the challenge request token. For example, the processing module compares a decrypted client signature, utilizing the client public key, to a calculated hash over the signature items and determines the client signature is valid when a comparison is substantially the same. The method branches to step 224 when the processing module determines that the complete request token is valid. The method continues to step 222 when the processing module determines that the complete request token is not valid. The method continues at step 214 where the processing module sends an error message. The method continues at step 224 where the processing module sends a complete response token when the processing module determines that the complete request token is valid. The complete response token includes an indicator that the request validation is successful.

FIG. 10B is a flowchart illustrating an example of producing a request, which include similar steps to FIG. 10A. The method begins with step 226 where a processing module (e.g., of a client, of a user device) sends a challenge request token to a server (e.g., a dispersed storage (DS) unit). The method continues at step 228 where the processing module receives a challenge response token. The method continues at step 230 where the processing module determines whether the challenge response token is trusted. The processing module determines that the challenge response token is trusted when successfully matching at least one certificate authority identifier within the server certificate chain to a known certificate authority identifier (e.g., from a local known certificate authority list). The method branches to step 234 when the processing module determines that the challenge response token is trusted. The method continues to step 214 of FIG. 10A when the processing module determines that the challenge response token is not trusted. The method continues with step 214 of FIG. 10A where the processing module sends an error message.

The method continues at step 234 where the processing module determines whether the challenge response token is valid when the processing module determines that the challenge response token is trusted. The processing module determines that the challenge response token is valid when verifying a server signature utilizing a server public key received in the challenge response token. For example, the processing module compares a decrypted server signature, utilizing the server public key, to a calculated hash over signature items and determines the server signature is valid when the comparison is substantially the same. The method branches to step 238 when the processing module determines that the challenge response token is valid. The method continues to step 214 of FIG. 10A when the processing module determines that the challenge response token is not valid. The method continues at step 214 of FIG. 10A where the processing module sends an error message.

The method continues at step 238 where the processing module sends a complete request token when the processing module determines that the challenge response token is valid. The method continues at step 240 where the processing module receives a complete response token. The messages previously discussed may be transmitted utilizing an industry standard protocol such as abstract syntax notation one (ASN.1).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of a computing device of a dispersed storage network (DSN), the method comprises:
   detecting unavailability of a storage device of a plurality of storage devices of a first site of a plurality of sites of DSN memory to produce an unavailable storage device, wherein the storage device includes a plurality of memory devices,
   wherein each of a plurality of data objects is divided into a plurality of data segments, wherein a data segment of the plurality of data segments is dispersed storage error encoded into a set of encoded data slices having a set of logical DSN addresses, wherein the plurality of storage devices of the first site stores encoded data slices of the plurality of data segments of the plurality of data objects having logical DSN addresses that include first slice index information, and wherein the plurality of storage devices of a second site of the plurality of sites stores encoded data slices of the plurality of data segments of the plurality of data objects having logical DSN addresses that include second slice index information;
   for encoded data slices stored by the unavailable storage device:
      reassigning, within the first site, the logical DSN addresses of the encoded data slices stored by the unavailable storage device to one or more other storage devices of the plurality of storage devices;
      rebuilding the encoded data slices stored by the unavailable storage device to produce rebuilt encoded data slices;
      storing the rebuilt encoded data slices in the one or more other storage devices;
      when the unavailable storage device becomes available, reallocating the logical DSN addresses of the encoded data slices stored by the unavailable storage device from the one or more other storage devices to the storage device; and
      transferring, within the first site, the rebuilt encoded data slices objects from the one or more other storage devices to the storage device.

2. The method of claim 1, wherein the detecting the unavailability of the storage device comprises one of:
   detecting unavailability of one or more memory devices of the plurality of memory devices associated with the storage device; and
   detecting that the storage device is off-line.

3. The method of claim 1, wherein the reassigning the logical DSN addresses of the encoded data slices stored by the unavailable storage device comprises:
   dividing the logical DSN addresses of the encoded data slices stored by the unavailable storage device into a first portion and a second portion, wherein a logical DSN address further includes data object identifying information and data segment identifying information;
   reassigning the first portion to one of the one or more other storage devices having a first contiguous range of data object identifying information and data segment identifying information; and
   reassigning the second portion to a second one of the one or more other storage devices having a second contiguous range of data object identifying information and data segment identifying information.

4. The method of claim 1, wherein the rebuilding the encoded data slices stored by the unavailable storage device comprises:
   sending rebuilding requests to storage units of other sites regarding the encoded data slices stored by the unavailable storage device;
   receiving, in response to the rebuilding requests, rebuilding data; and
   rebuilding the encoded data slices stored by the unavailable storage device from the rebuilding data.

5. The method of claim 1, wherein the storing the rebuilt encoded data slices in the one or more other storage devices comprises:
   sending write requests to the one or more other storage devices regarding the rebuilt encoded data slices, wherein a write request of the write requests includes one of the logical DSN addresses of the encoded data slices stored by the unavailable storage device and a corresponding one of the rebuilt encoded data slices.

6. The method of claim 1 further comprises:
detecting that the unavailable storage device is available based on one or more of:
a repair or replacement of the unavailable storage device;
the unavailable storage device coming back on-line; and
a repair or replacement of a memory device within the storage device.

7. The method of claim 1, wherein the transferring the rebuilt encoded data slices comprises:
issuing one or more write commands to the one or more other storage devices to write the rebuilt encoded data slices to the storage device;
receiving an acknowledge of successful storage of the rebuilt encoded data slices by the storage device; and
issuing a delete command to the one or more other storage devices to delete the rebuilt encoded data slices.

8. A dispersed storage (DS) processing module of a dispersed storage network (DSN), the DS processing module comprises:
a first module, when operable within a computing device, causes the computing device to:
detect unavailability of a storage device of a plurality of storage devices of a first site of a plurality of sites of DSN memory to produce an unavailable storage device, wherein the storage device includes a plurality of memory devices,
wherein each of a plurality of data objects is divided into a plurality of data segments,
wherein a data segment of the plurality of data segments is dispersed storage error encoded into a set of encoded data slices having a set of logical DSN addresses, wherein the plurality of storage devices of the first site stores encoded data slices of the plurality of data segments of the plurality of data objects having logical DSN addresses that include first slice index information, and wherein the plurality of storage devices of a second site of the plurality of sites stores encoded data slices of the plurality of data segments of the plurality of data objects having logical DSN addresses that include second slice index information; and
a second module, when operable within the computing device, causes the computing device to:
for encoded data slices stored by the unavailable storage device:
reassign, within the first site, the logical DSN addresses of the encoded data slices stored by the unavailable storage device to one or more other storage devices of the plurality of storage devices;
rebuild the encoded data slices stored by the unavailable storage device to produce rebuilt encoded data slices;
store the rebuilt encoded data slices in the one or more other storage devices;
when the unavailable storage device becomes available, reallocate the logical DSN addresses of the encoded data slices stored by the unavailable storage device from the one or more other storage devices to the storage device; and
transfer, within the first site, the rebuilt encoded data slices objects from the one or more other storage devices to the storage device.

9. The DS processing module of claim 8, wherein the first module functions to detect the unavailability of the storage device by one of:
detecting unavailability of one or more memory devices of the plurality of memory devices associated with the storage device; and
detecting that the storage device is off-line.

10. The DS processing module of claim 8, wherein the second module functions to reassign the logical DSN addresses of the encoded data slices stored by the unavailable storage device by:
dividing the logical DSN addresses of the encoded data slices stored by the unavailable storage device into a first portion and a second portion, wherein a logical DSN address further includes data object identifying information and data segment identifying information;
reassigning the first portion to one of the one or more other storage devices having a first contiguous range of data object identifying information and data segment identifying information; and
reassigning the second portion to a second one of the one or more other storage devices having a second contiguous range of data object identifying information and data segment identifying information.

11. The DS processing module of claim 8, wherein the second module functions to rebuild the encoded data slices stored by the unavailable storage device by:
sending rebuilding requests to storage units of other sites regarding the encoded data slices stored by the unavailable storage device;
receiving, in response to the rebuilding requests, rebuilding data; and
rebuilding the encoded data slices stored by the unavailable storage device from the rebuilding data.

12. The DS processing module of claim 8, wherein the second module functions to store the rebuilt encoded data slices in the one or more other storage devices by:
sending write requests to the one or more other storage devices regarding the rebuilt encoded data slices, wherein a write request of the write requests includes one of the logical DSN addresses of the encoded data slices stored by the unavailable storage device and a corresponding one of the rebuilt encoded data slices.

13. The DS processing module of claim 8 further comprises:
the second module, when operable within the computing device, further causes the computing device to:
detect that the unavailable storage device is available based on one or more of:
a repair or replacement of the unavailable storage device;
the unavailable storage device coming back on-line; and
a repair or replacement of a memory device within the storage device.

14. The DS processing module of claim 8, wherein the second module functions to transfer the rebuilt encoded data slices by:
issuing one or more write commands to the one or more other storage devices to write the rebuilt encoded data slices to the storage device;
receiving an acknowledge of successful storage of the rebuilt encoded data slices by the storage device; and
issuing a delete command to the one or more other storage devices to delete the rebuilt encoded data slices.

* * * * *